United States Patent
Seki et al.

(10) Patent No.: US 11,274,624 B2
(45) Date of Patent: Mar. 15, 2022

(54) CONTROLLER

(71) Applicant: DENSO CORPORATION, Kariya (JP)

(72) Inventors: Naoto Seki, Kariya (JP); Naoyuki Yamada, Kariya (JP); Mohamed Kuthbudeen Syed Mohamed, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/113,255

(22) Filed: Dec. 7, 2020

(65) Prior Publication Data

US 2021/0172395 A1 Jun. 10, 2021

(30) Foreign Application Priority Data

Dec. 9, 2019 (JP) .............................. JP2019-221814

(51) Int. Cl.
*F02D 41/38* (2006.01)
*F02M 59/02* (2006.01)
*F02M 55/02* (2006.01)
*F02D 1/00* (2006.01)
*F02M 59/22* (2006.01)

(52) U.S. Cl.
CPC ............... *F02D 41/38* (2013.01); *F02D 1/00* (2013.01); *F02D 41/3836* (2013.01); *F02M 55/025* (2013.01); *F02M 59/025* (2013.01); *F02M 59/22* (2013.01)

(58) Field of Classification Search
CPC ........ F02D 41/38; F02D 41/3836; F02D 1/00; F02M 55/025; F02M 59/025; F02M 59/22
USPC ....................................................... 123/446
See application file for complete search history.

(56) References Cited

U.S. PATENT DOCUMENTS 5,103,792 A * 4/1992 Winkler ................ F02D 41/401
                                                              123/506
2005/0229896 A1   10/2005 Hori
2007/0110603 A1 *  5/2007 Usui .................... F02M 63/005
                                                              417/505

FOREIGN PATENT DOCUMENTS

| DE | 10 2008 000 772 | 1/2009 |
| JP | 2003-222047 | 8/2003 |
| JP | 2013-167187 | 8/2013 |
| JP | 2018-053843 | 4/2018 |

OTHER PUBLICATIONS

JP2013167187A (Kaneko, Hirotaka) (Aug. 29, 2013) (Machine Translation) retrieved from espacenet on Jul. 26, 2021. (Year: 2013).*

* cited by examiner

*Primary Examiner* — Mahmoud Gimie
(74) *Attorney, Agent, or Firm* — Nixon & Vanderhye P.C.

(57) ABSTRACT

A vehicle includes a pump configured to discharge a fuel by reciprocating a plunger, a rail configured to store the fuel discharged from the pump, and a fuel injection valve configured to inject the fuel supplied from the rail. A controller for the vehicle includes a waveform obtaining unit and a phase shift obtaining unit. The waveform obtaining unit is configured to obtain a waveform of a fuel pressure in the rail as a function of time in a predetermined period. The phase shift obtaining unit is configured to obtain a phase shift based on the waveform obtained by the waveform obtaining unit. The phase shift is an offset between a timing the plunger reciprocated in the pump arrives at a first position and a timing a piston reciprocating in an internal combustion engine arrives at a second position.

18 Claims, 13 Drawing Sheets

CONTROLLER

CROSS REFERENCE TO RELATED APPLICATION

This application is based on Japanese Patent Application No. 2019-221814 filed on Dec. 9, 2019, the disclosure of which is incorporated herein by reference in its entirety.

TECHNICAL FIELD

The present disclosure relates to a controller for a vehicle.

BACKGROUND

A vehicle that has a so-called "common rail type" fuel supply system includes a pump, a rail, and a fuel injection valve. The pump is configured to discharge a fuel by reciprocating a plunger. The rail is configured to store the fuel discharged from the pump. The fuel injection valve is configured to inject the fuel supplied from the rail. A controller for such vehicle controls to the fuel injection valve to inject fuel into a cylinder of an internal combustion engine by opening the fuel injection valve at an appropriate timing and in an appropriate period while keeping the pressure of the fuel in the rail substantially constant.

SUMMARY

The present disclosure relates to a controller for a vehicle. The vehicle includes a pump configured to discharge a fuel by reciprocating a plunger, a rail configured to store the fuel discharged from the pump, and a fuel injection valve configured to inject the fuel supplied from the rail. The controller includes a waveform obtaining unit and a phase shift obtaining unit. The waveform obtaining unit is configured to obtain a waveform of a pressure of the fuel stored in the rail as a function of time in a predetermined period. The phase shift obtaining unit is configured to obtain a phase shift based on the waveform obtained by the waveform obtaining unit. The phase shift is an offset between a timing the plunger reciprocating in the pump arrives at a first position and a timing a piston reciprocating in an internal combustion engine of the vehicle arrives at a second position.

DETAILED DESCRIPTION

Figure 1:
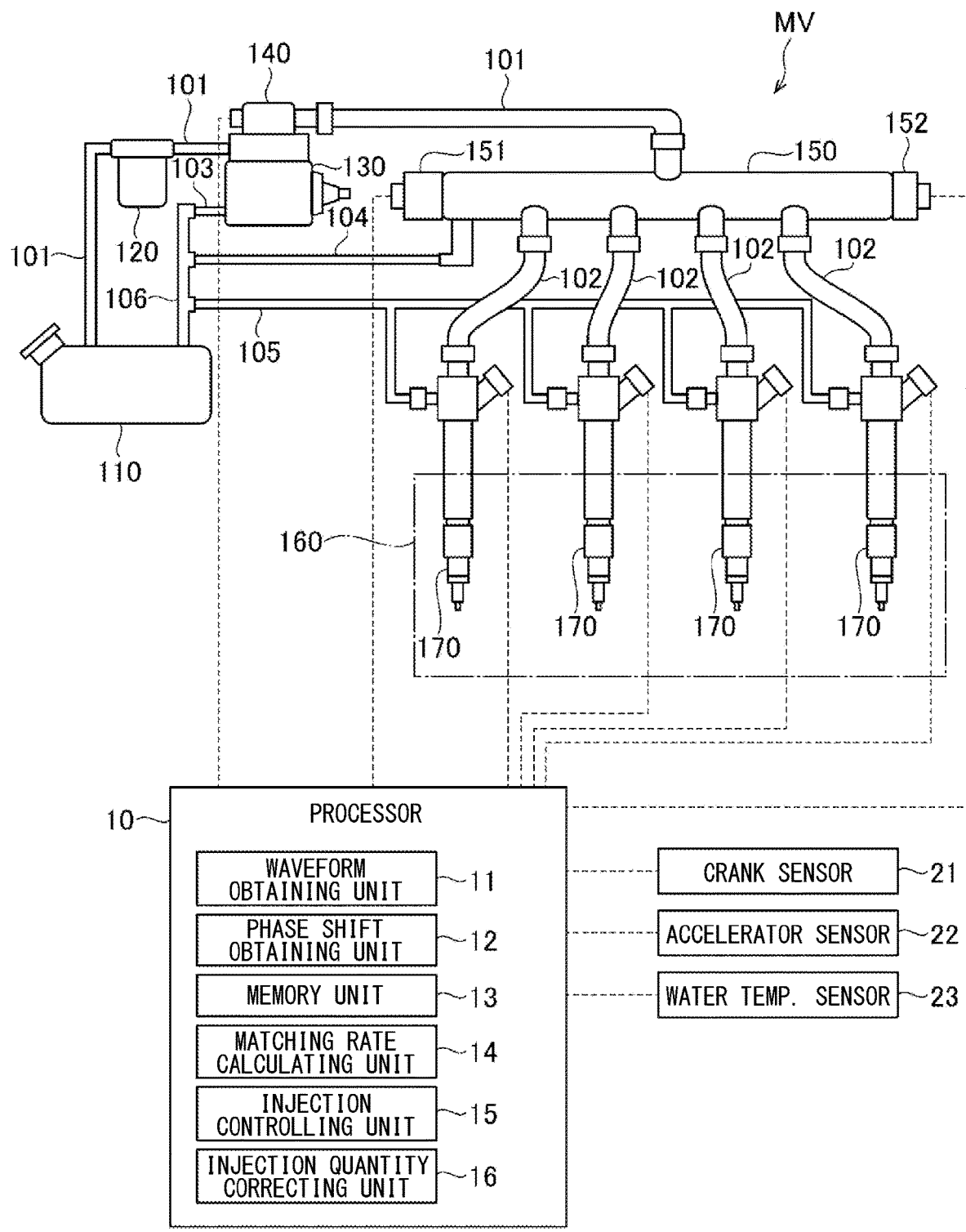
FIG. 1 is a schematic view of a configuration of a controller in this embodiment and a vehicle equipped with the controller.

To begin with, examples of relevant techniques will be described.

A vehicle that has a so-called "common rail type" fuel supply system includes a pump, a rail, and a fuel injection valve. The pump is configured to discharge a fuel by reciprocating a plunger. The rail is configured to store the fuel discharged from the pump. The fuel injection valve is configured to inject the fuel supplied from the rail. A controller for such vehicle controls to the fuel injection valve to inject fuel into a cylinder of an internal combustion engine by opening the fuel injection valve at an appropriate timing and in an appropriate period while keeping the pressure of the fuel in the rail substantially constant.

By the way, when a phase shift which is an offset between a timing the plunger reciprocating in the pump arrives at a first position (e.g., a top dead center) and a timing a piston reciprocating in the internal combustion engine arrives at a second position (e.g., a top dead center) is different from a designed value, a corresponding relationship between an injection quantity and a period for opening the fuel injection valve may change.

Thus, it is required to attach the pump to the vehicle such that the phase shift has a designed value. However, the attachment requires skill of an operator and it is required to define a key recess in a member in advance. Thus, manufacturing cost and component cost increase.

Therefore, a controller is configured to obtain a phase shift after the pump is attached and correct an injection quantity of the fuel based on the obtained phase shift. This method can eliminate the need to accurately match the phase shift to a specific value when the pump is attached.

The controller is configured to obtain a change amount of a rail pressure unit of time (i.e., an increase characteristic of the fuel pressure) when the internal combustion engine is started. Then, the controller is configured to obtain a phase shift based on a timing that a graph of the increase characteristic shows an inflection point.

However, in many cases, the fuel pressure change includes noises such as pulsation. Thus, it is considered difficult to accurately determine the timing of a specific point described above and accurately obtain the phase shift based on the determination.

It is objective of the present disclosure to provide a controller that can accurately obtain a phase shift.

A controller of the present disclosure is a controller for a vehicle. The controlled vehicle includes a pump configured to discharge a fuel by reciprocating a plunger, a rail configured to store the fuel discharged from the pump, and a fuel injection valve configured to inject the fuel supplied from the rail. The controller includes a waveform obtaining unit and a phase shift obtaining unit. The waveform obtaining unit is configured to obtain a waveform of a pressure of the fuel stored in the rail as a function of time in a predetermined period. The phase shift obtaining unit is configured to obtain a phase shift based on the waveform obtained by the waveform obtaining unit. The phase shift is an offset between a timing the plunger reciprocating in the pump arrives at a first position and a timing a piston reciprocating in an internal combustion engine of the vehicle arrives at a second position.

According to experiments conducted by the inventors of the present disclosure, there is a correlation between the phase shift and the waveform of the pressure of the fuel stored in the rail as a function of time. Thus, the phase shift obtaining unit of the controller configured as above obtains the phase shift based on the waveform obtained by the waveform obtaining unit. For example, the phase shift corresponding to the waveform obtained by the waveform obtaining unit can be obtained by preparing in advance a correspondence table listing reference waveforms and reference phase shifts and referring to the correspondence table.

The controller obtains the phase shift not based on a specified timing such as a timing the change of the fuel pressure is at an inflection point, but based on a shape of a graph (i.e., the waveform) of the change as a function of time in a predetermined period. Therefore, an influence of noise can be reduced and the phase shift is relatively accurately obtained even if a part of the waveform includes the noise such as pulsation.

According to the present disclosure, a controller that can accurately obtain a phase shift is provided.

Hereinafter, the present embodiments will be described with reference to the attached drawings. In order to facilitate the ease of understanding, the same reference numerals are attached to the same constituent elements in each drawing where possible, and redundant explanations are omitted.

A controller 10 in this embodiment is mounted in a vehicle MV together with an internal combustion engine 160 and configured as a device to control the internal combustion engine 160 and the like. With reference to FIG. 1, a configuration of the vehicle MV will be firstly described.

In FIG. 1, configurations of the internal combustion engine 160, a fuel supply system, and the like in the vehicle MV are schematically described. The vehicle MV includes a fuel tank 110, a pump 130, a rail 150, a fuel injection valve 170, and the internal combustion engine 160.

The fuel tank 110 is a container for storing a fuel to be supplied into the internal combustion engine 160. In this embodiment, the internal combustion engine 160 is configured as a diesel engine and light oil is used as the fuel. One end of a fuel pipe 101 is fluidly connected to the fuel tank 110. The other end of the fuel pipe 101 is fluidly connected to the rail 150 which will be described later.

A filter 120 is disposed in a position of the fuel pipe 101 between the fuel tank 110 and the pump 130. The filter 120 collects and removes foreign matters contaminated in the fuel flowing through the fuel pipe 101. A low-pressure pump that discharges the fuel from the fuel tank 110 is disposed at a position of the fuel pipe 101 upstream of the filter 120, but the illustration thereof is omitted in FIG. 1. The fuel discharged from the low-pressure pump flows through the filter 120 to remove the foreign matters and supplied into the pump 130 which will be described next.

Figure 2:
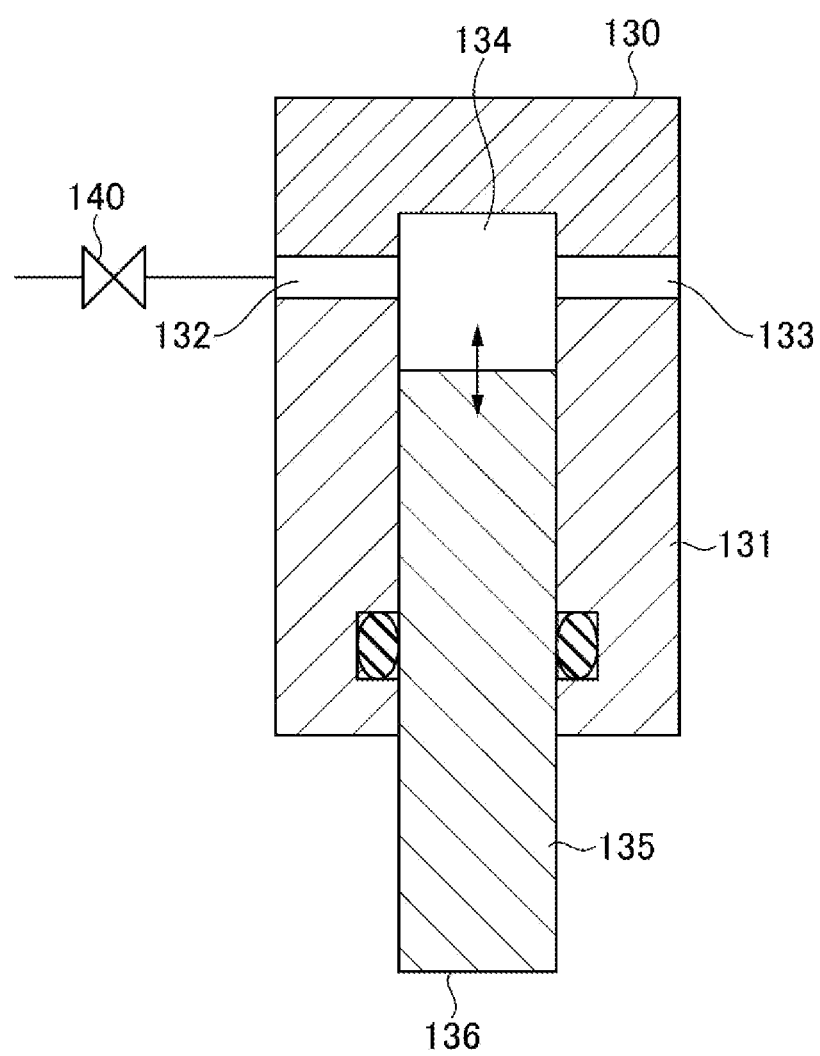
FIG. 2 is a schematic view of a configuration of a pump.

The pump 130 further pressurizes the fuel discharged from the low-pressure pump and discharges the fuel to the rail 150 on a downstream side of the pump 130. In FIG. 2, a configuration of the pump 130 is schematically illustrated.

As shown in the figure, the pump 130 includes a body portion 131 and a plunger 135.

The body portion 131 is a substantially tubular container and defines a space therein. The plunger 135 is inserted into the space from a lower side of the body portion 131 in FIG. 2. A pressurizing chamber 134 is defined between an upper end of the plunger 135 and an inner surface of the body portion 131.

The body portion 131 defines an inlet portion 132 and an outlet portion 133. The inlet portion 132 is an opening defined as an inlet for the fuel to be supplied into the pressurizing chamber 134 from the fuel tank 110. The outlet portion 133 is an opening defined as an outlet for the fuel to be sent toward the rail 150 from the pressurizing chamber 134.

The plunger 135 reciprocates in an up-down direction in FIG. 2 in synchronization with a movement of a cylinder (not shown) of the internal combustion engine 160. The plunger 135 has an end 136 that is located outside of the body portion 131. To realize such reciprocating moving, the end 136 is configured to receive a force from a cam disposed in a crankshaft (not shown).

When the plunger 135 moves downward in FIG. 2 and a volume of the pressurizing chamber 134 increases, the fuel is supplied into the pressurizing chamber 134 through the inlet portion 132. After that, when the plunger 135 moves upward in FIG. 2 and the volume of the pressurizing chamber 134 decreases, the fuel in the pressurizing chamber 134 is pressurized and discharged out of the outlet portion 133. The outlet portion 133 includes a valve to restrict the fuel from flowing backward toward the pressurizing chamber 134, but an illustration thereof is omitted in FIG. 2.

A minute gap is defined between the inner surface of the body portion 131 and an outer circumferential surface of the plunger 135. The body portion 131 defines an overflow passage (not shown) to discharge the fuel flowing into the gap outward. The fuel flowing into the overflow passage flows through an overflow pipe 103 and a return pipe 106 which are shown in FIG. 1 and returns into the fuel tank 110.

As described above, the pump 130 is configured as a pump to discharge the fuel by reciprocating the plunger 135. As a configuration of such pump 130, known configurations may be employed. Thus, illustrations and descriptions of more detailed configuration of the pump 130 are omitted.

The pump 130 includes an adjusting valve 140. The adjusting valve 140 is configured as an electromagnetic valve that can adjust an opening degree of the adjusting valve 140 according to external signals. The adjusting valve 140 is disposed in a vicinity of the inlet portion 132 of the pump 130. When the opening degree of the adjusting valve 140 is decreased, a quantity of the fuel supplied into the pressurizing chamber 134 through the inlet portion 132, i.e., a quantity of the fuel supplied into the pump 130 is decreased. On the contrary, when the opening degree of the adjusting valve 140 is increased, the quantity of the fuel supplied into the pump 130 is increased.

The controller 10 calculates a requested quantity of the fuel discharged from the pump 130 to the rail 150 and appropriately adjusts the opening degree of the adjusting valve 140 depending on the requested quantity, thereby adjusting the quantity of the fuel supplied into the pump 130. As a result, the quantity of the fuel discharged from the pump 130 is set to the requested quantity.

Returning to FIG. 1, explanation will be continued. The rail 150 is also called "a common rail" and a container for storing the fuel discharged from the pump 130. Since the fuel pressurized by the pump 130 is supplied into the rail 150, a pressure of the fuel in the pump 130 is kept high. Thereby, the high-pressure fuel can be injected by the fuel injection valve 170 which will be described later.

The rail 150 includes a fuel pressure sensor 152 and a decompression valve 151. The fuel pressure sensor 152 is a pressure sensor to measure a pressure of the fuel in the rail 150. The pressure of the fuel measured by the fuel pressure sensor 152 is transmitted to the controller 10.

The decompression valve 151 is an opening-closing valve that discharges a part of the fuel from the rail 150 and keeps the pressure of the fuel in the rail 150 at an appropriate value. When the decompression valve 151 is opened, a part of the fuel in the rail 150 is returned into the fuel tank 110 through a relief pipe 104 and the return pipe 106. The controller 10 controls the adjusting valve 140 depending on the requested quantity and also controls the decompression valve 151 such that the pressure of the fuel measured by the fuel pressure sensor 152 is set to an appropriate value.

The fuel injection valve 170 is a so-called "injector" and an opening-closing valve configured to inject and supply the fuel supplied from the rail 150 into the internal combustion engine 160. The single fuel injection valve 170 is provided for each of cylinders (not shown) of the internal combustion engine 160. In this embodiment, the internal combustion engine 160 includes four cylinders and four fuel injection valves 170. High-pressure fuel pipes 102 fluidly connect between the rail 150 and each of the fuel injection valves 170.

The fuel injection valve 170 is an electromagnetic valve configured to selectively open and close according to signals input from an external device. When the fuel injection valve 170 is opened, the high-pressure fuel supplied from the rail 150 is injected by the fuel injection valve 170 and supplied into the cylinders of the internal combustion engine 160. A part of the fuel supplied into the fuel injection valve 170 is not injected by the fuel injection valve 170 but returns into the fuel tank 110 through a leak pipe 105 and the return pipe 106. The controller 10 controls an opening-closing of the fuel injection valve 170.

The internal combustion engine 160 is an engine configured to generate a driving force for running the vehicle MV by burning the supplied fuel in the cylinders. As described above, the internal combustion engine 160 is configured as a four-cylinder diesel engine. The internal combustion engine 160 is configured to reciprocate the pistons in the cylinders by burning the fuel and convert the reciprocating movement to a rotation of a crankshaft. A configuration of such internal combustion engine 160 may be a known one and concrete illustrations and explanations thereof will be omitted.

Other configurations will be described. The vehicle MV includes a crank sensor 21, an accelerator sensor 22, and a water temperature sensor 23.

The crank sensor 21 is a sensor to detect a phase of a rotational angle of the crankshaft described above. The phase detected by the crank sensor 21 is transmitted to the controller 10.

The accelerator sensor 22 is a sensor to detect a depressing amount of the accelerator pedal (not shown) disposed in the vehicle MV. The depressing amount detected by the accelerator sensor 22 is transmitted to the controller 10.

The water temperature sensor 23 is a sensor to detect a temperature of a cooling water passing through the internal combustion engine 160. The temperature detected by the water temperature sensor 23 is transmitted to the controller 10.

With continued reference to FIG. 1, a configuration of the controller 10 will be described. The controller 10 is configured as a device to control the internal combustion engine 160 and the like as described above. The controller 10 is constituted as a computer system including a CPU, a ROM, a RAM, and the like. The controller 10 may be constituted as a single device or as multiple devices that communicate with each other. A part or all parts of the controller 10 may be disposed in a position outside of the vehicle MV without being mounted in the vehicle MV. The controller includes a processor. A specific configuration and installation location of the controller 10 are not particularly limited.

The controller 10 includes, as functional control blocks, a waveform obtaining unit 11, a phase shift obtaining unit 12, a memory unit 13, a matching rate calculating unit 14, an injection controlling unit 15, and an injection quantity correcting unit 16.

The waveform obtaining unit 11 is a portion to perform a process for obtaining a waveform of the pressure of the fuel stored in the rail 150 as a function of time in a predetermined period. The waveform obtaining unit 11 is configured to obtain the waveform of the pressure by sampling pressure values of the fuel at predetermined timings. The pressure values are obtained by the fuel pressure sensor 152. The interval between the predetermined timings, for example, may be an interval that a rotational angle of the crankshaft (not shown) changes by 6 degrees. "The predetermined period" described above may be a period in which a phase of the rotational angle of the crankshaft (not shown) falls within a predetermined phase range.

The phase shift obtaining unit 12 is a portion to perform a process for obtaining the phase shift. "The phase shift" is an offset between a timing the plunger 135 reciprocating in the pump 130 arrives at a first position (e.g., a top dead center) and a timing the piston reciprocating in the internal combustion engine 160 arrives at a second position (e.g., the top dead center). For example, when the timing the plunger 135 arrives at the top dead center that is the first position matches the timing the piston of the internal combustion engine 160 arrives at the top dead center, the phase shift is zero. The phase shift is a parameter mechanically defined at a point when the pump 130 is attached to the vehicle MV.

The phase shift obtaining unit 12 obtains the phase shift based on the waveform obtained by the waveform obtaining unit 11. The specific contents of process executed therefor will be described later.

The memory unit 13 is a portion to store in advance a correspondence table listing multiple reference waveforms and multiple reference phase shifts. The reference waveforms are obtained by the waveform obtaining unit 11. There is a one-to-one correspondence between the reference waveforms and the reference phase shifts. The phase shift obtaining unit 12 obtains the phase shift by referring to the correspondence table stored in the memory unit 13. Specific contents of information stored in the memory unit 13 will be described later.

The matching rate calculating unit 14 is a portion to perform a process for calculating a matching rate that is a parameter required for the process performed by the phase shift obtaining unit 12. Specific definition and a calculation method of "the matching rate" will be described later.

The injection controlling unit 15 is a portion to control an opening-closing of each of the fuel injection valves 170. The fuel injection controlling unit 15 transmits injection instruction signals to the fuel injection valves 170. While the injection instruction signal is turned on, the fuel injection valve 170 that receives the signal is opened and the fuel is injected into the internal combustion engine from the fuel injection valve 170. The injection controlling unit 15 sets, for each of the fuel injection valves 170, a timing the injection instruction signal is turned on and a length of a period in which the injection instruction signal is turned on based on a depression amount detected by the accelerator sensor 22 and the like.

The injection quantity correcting unit 16 is a portion to perform a process for correcting the injection instruction signal as necessary so that a quantity of the fuel to be actually injected by the fuel injection valve 170 has a target quantity. As is well known, a quantity of the fuel that is actually injected by the fuel injection valve 170 varies due to an influence of the phase shift. The injection quantity correcting unit 16 corrects the injection quantity from the fuel injection valve 170 based on the phase shift obtained by the phase shift obtaining unit 12. Specific method for correction will be described later.

FIG. 3(A) is a graph illustrating a change of a position of the piston in the internal combustion engine 160 when the piston reciprocates in the cylinder. The horizontal axis of the graph is the phase detected by the crank sensor 21, i.e., the phase of the rotational angle of the crankshaft. Hereinafter, the phase is referred to as a "crank phase".

While the internal combustion engine 160 is operated, as is well known, the piston reciprocates between a top dead center TDC and a bottom dead center BDC. In FIG. 3(A), the piston reaches the top dead center TDC at a timing the crank phase is C1 or C2.

FIG. 3(B) is a graph illustrating a change of a position of the plunger 135 when the plunger 135 reciprocates in the pump 130. The horizontal axis of the graph is the crank phase as with the horizontal axis of FIG. 3(A).

As described with reference to FIG. 2, the plunger 135 reciprocates in the body portion 131 while the internal combustion engine 160 is operated. In FIG. 3(B), a position of the plunger 135 when the pressurizing chamber 134 has the smallest volume is shown as a top dead center TDC as with the FIG. 3(A). A position of the plunger 135 when the pressurizing chamber 134 has the largest volume is shown as a bottom dead center BDC as with FIG. 3(A).

In FIG. 3(B), the plunger 135 reaches the top dead center TDC at a timing the crank phase is C1 or C2.

In this embodiment, "the phase shift" is defined as an offset of the crank phase between a timing the plunger 135 reaches the top dead center TDC and a timing the piston of the internal combustion engine 160 reaches the top dead center TDC. In the example shown in FIG. 3, the above timings match with each other, so that the phase shift is zero.

Figure 3:
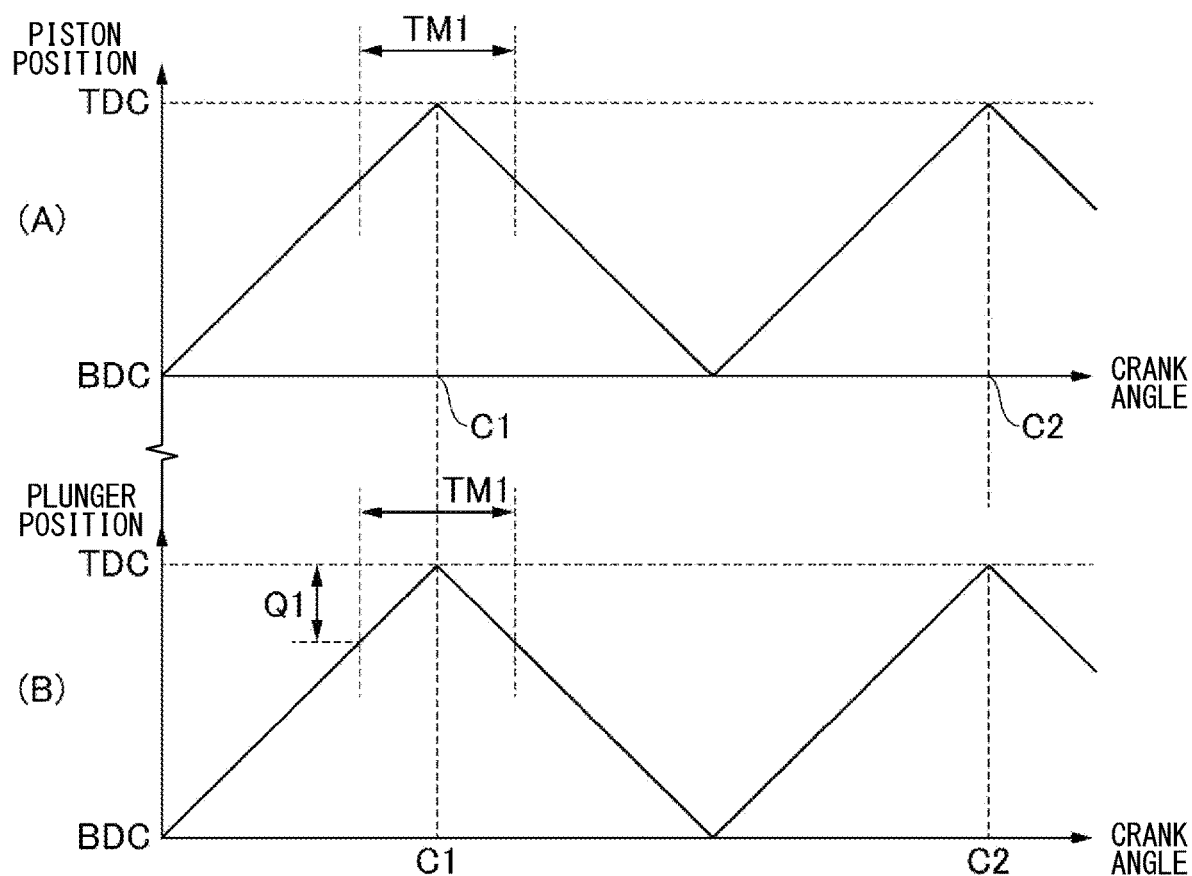
FIG. 3 is a diagram explaining a phase shift.
Figure 4:
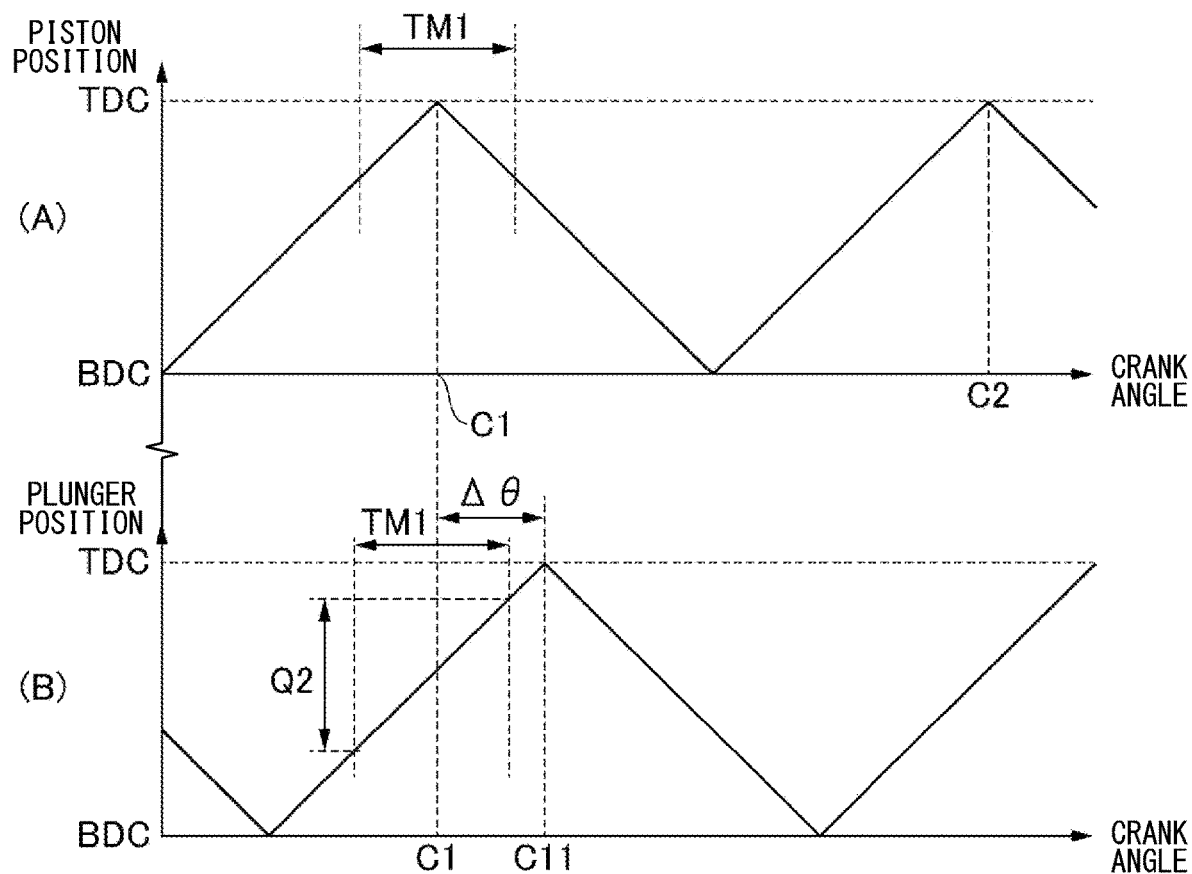
FIG. 4 is a diagram explaining a phase shift.

In FIG. 4, a change of the position of the piston and the like when the phase shift is not zero is shown in the same way in FIG. 3. The change of the position of the piston shown in FIG. 4(A) is the same with that in FIG. 3(A). On the other hand, the change of position of the plunger 135 shown in FIG. 4(B) is different from that in FIG. 3(B). Specifically, in the example in FIG. 4(B), the plunger 135 arrives at the top dead center TDC at a timing the crank phase is C11 that is after C1. Thus, in the example in FIG. 4, the phase shift is $\Delta\theta$ which is the difference between C11 and C1.

The definition of the phase shift is not limited to the above definition. For example, the phase shift may be defined as an offset between a timing the plunger 135 arrives at the bottom dead center BDC and a timing the piston of the internal combustion engine 160 arrives at the bottom dead center BDC. The phase shift may be defined as an offset between a timing the plunger 135 arrives at the bottom dead center BDC and a timing the piston of the internal combustion engine 160 arrives at the top dead center TDC. As described above, each of "the first position and the second position" that is a reference position to define the phase shift can be set to an arbitrary position.

Reason the phase shift affects the injection quantity will be described with reference to FIGS. 3 and 4. A duration TM1 shown in each figure is an injection duration in which the injection instruction signal is turned on. That is, the duration TM1 is the injection duration in which the fuel injection valve 170 is opened and the fuel is injected. The duration TM1 is set corresponding to the position of the piston of the internal combustion engine 160. In this example, the duration TM1 is set to a predetermined period including the timing the piston of the internal combustion engine 160 arrives at the top dead center.

In the example in FIG. 3, the pump 130 discharges the fuel as the plunger 135 moves upward in a period from the start timing of the duration TM1 to the timing the crank phase is C1. "Q1" shown in FIG. 3(B) is an amount that the plunger 135 moves upward during the duration.

Hereinafter, a quantity of the fuel discharged from the pump 130 while the fuel is injected by the fuel injection valve 170, i.e., during the duration TM1 in FIG. 3 is defined as a "discharge quantity". The discharge quantity is approximately proportional to the amount in which the plunger 135 moves upward in the duration TM1. Thus, "Q1" shown in FIG. 3(B) is also referred to as the discharge quantity at the phase shift of zero.

In an example shown in FIG. 4, the plunger 135 keeps moving upward in the duration TM1. Thus, the fuel is discharged from the pump 130 as the plunger 135 moves upward in a period from the start timing of the duration TM1 to an end timing of the duration TM1. "Q2" shown in FIG. 4(B) is an amount that the plunger 135 moves upward in the duration TM1. "Q2" is also referred to as the discharge quantity at the phase shift of $\Delta\theta$.

Q2 is larger than Q1. That is, the discharge quantity at the phase shift of $\Delta\theta$ as shown in the example in FIG. 4 is greater than the discharge quantity at the phase shift of zero as shown in the example in FIG. 3. As the discharge quantity increases, the injection quantity of the fuel to be injected by the opened fuel injection valve 170 increases.

As described above, when the phase shift is different even if the duration TM1 is the same, a quantity of the fuel injected by the fuel injection valve 170 differs. That is, a relationship between the length of the duration TM1 and the injection quantity of the fuel changes along with the phase shift. Thus, in order to inject an accurate quantity of the fuel as targeted from the fuel injection valve 170, it is required to accurately obtain the phase shift with the phase shift obtaining unit 12 and correct the injection instruction signal according to the phase shift.

Figure 5:
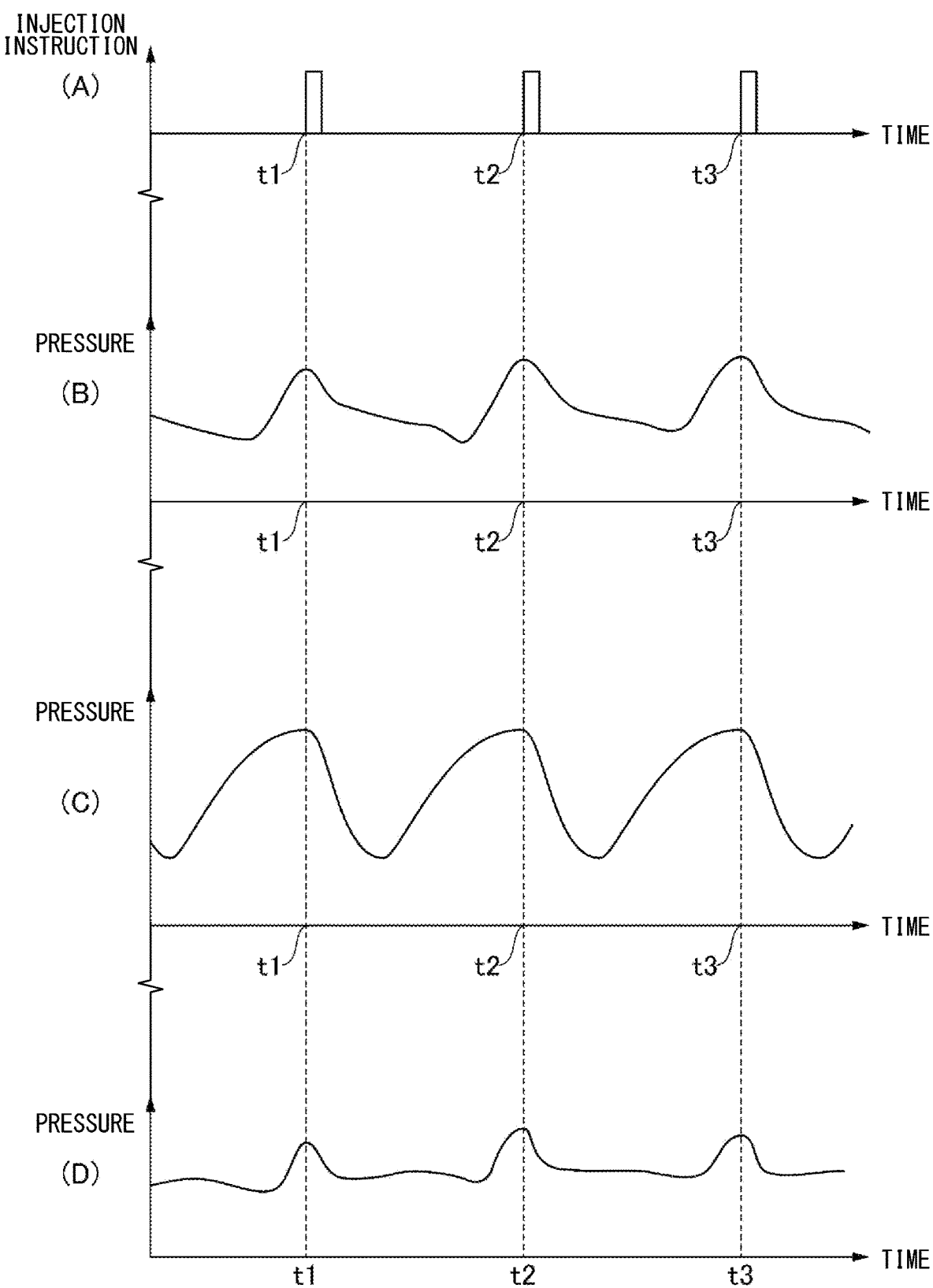
FIG. 5 is a diagram explaining a relationship between a phase shift and a waveform of pressure of fuel.

An outline method that the phase shift obtaining unit 12 obtains the phase shift will be described with reference to FIG. 5. FIG. 5(A) is an example of the injection instruction signal transmitted to the fuel injection valve 170. In FIG. 5, the injection instruction signal is turned on at times t1, t2, and t3.

FIG. 5(B) illustrates a change of the pressure of the fuel in the rail 150 as a function of time at the phase shift of zero. FIG. 5(C) illustrates a change of the pressure of the fuel in the rail 150 as a function of time when the phase shift is 48 degrees. FIG. 5(D) illustrates a change of the pressure of the fuel in the rail 150 as a function of time when the phase shift is 96 degrees.

In any cases, the pressure of the fuel in the rail 150 increases as the fuel is delivered by the pump 130 and decreases as the fuel is injected by the fuel injection valve 170. However, waveforms of the pressure as a function of time at different phase shifts are different with each other according to magnitude of the phase shifts. According to experiments conducted by the inventors of the present disclosure, as shown in FIG. 5, there is a correlation between the waveform of the pressure of the fuel 150 in the rail as a function of time and the phase shift.

Thus, in the controller 10 in this embodiment, the memory unit 13 stores a correspondence table listing the reference waveforms obtained by the waveform obtaining unit 11 and the reference phase shifts. The phase shift obtaining unit 12 obtains the phase shift by referring to the correspondence table using the waveform obtained by the waveform obtaining unit 11. For example, when the waveform obtained by the waveform obtaining unit 11 is similar to the waveform shown in FIG. 5(C), the phase shift is 48 degrees.

Specific flow of the process for obtaining the phase shift will be described with reference to FIG. 6. The series of the processes shown in FIG. 6 is started when the internal combustion engine 160 of the vehicle MV is started with the pump 130 attached to the vehicle MV and repeatedly executed by the controller 10 every predetermined control cycle.

In first step S01 in this process, it is determined whether an obtaining condition is satisfied or not. "The obtaining condition" is a predetermined condition suitable for obtaining the waveform by the waveform obtaining unit 11. The obtaining condition may be that the instruction value of the injection quantity transmitted to the fuel injection valve 170 falls within a predetermined range, that the timing of the injection instruction falls within a predetermined range of the crank phase, that the interval of the injection instruction falls within a predetermined range of the crank phase, that the injection pattern falls within a predetermined range, that the instruction value of the fuel pressure in the rail 150 falls within a predetermined range, that an absolute value of a difference between the instruction value and the measured value of the fuel pressure in the rail 150 falls within a predetermined range, that the rotational speed of the internal combustion engine 160 falls within a predetermined range, and the like. The obtaining condition may be determined to be satisfied when all of the above-described conditions are satisfied or when one or some of the conditions is satisfied.

Figure 6:
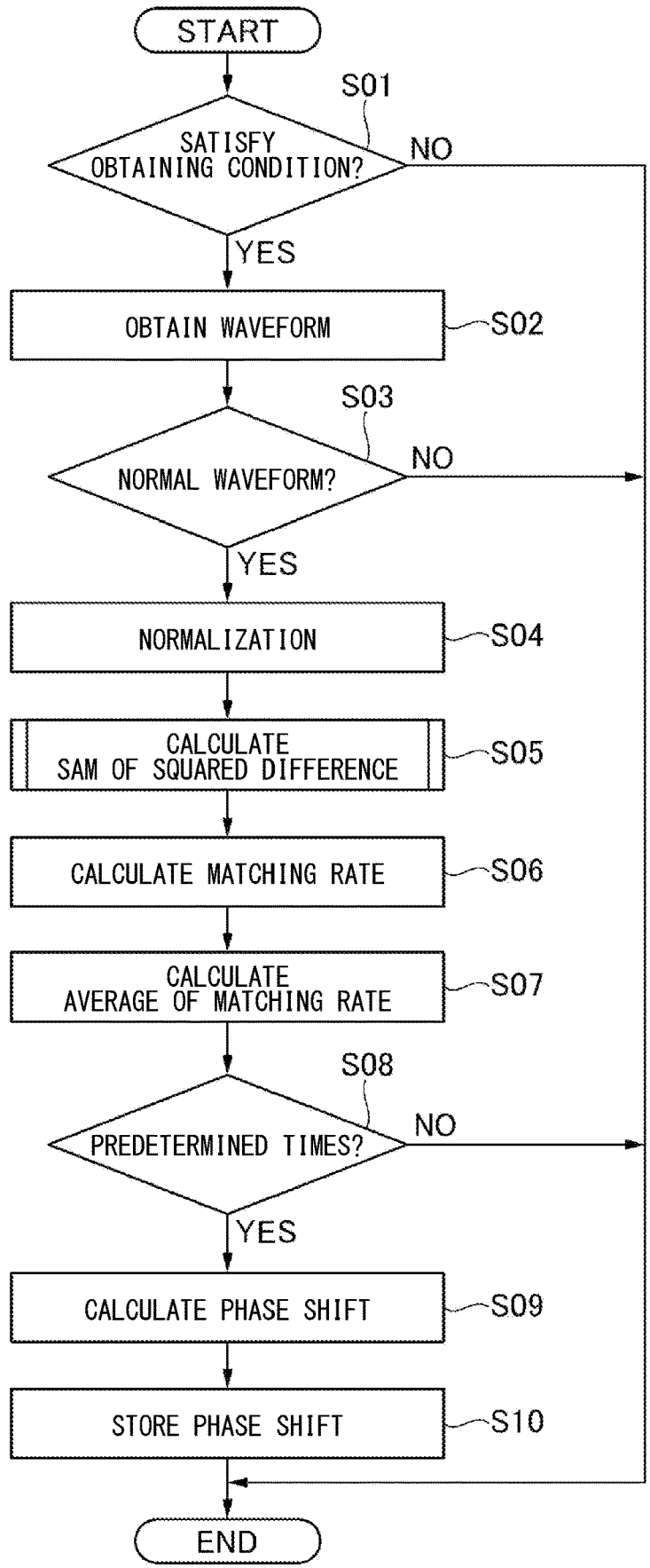
FIG. 6 is a flowchart of a process executed by the controller.

When the obtaining condition is not satisfied, the series of the process shown in FIG. 6 is terminated for a moment. In this case, the process in step S02 and the following steps are kept waiting until the obtaining condition is satisfied.

When the obtaining condition is satisfied, the process proceeds to step S02. In step S02, the waveform obtaining unit 11 obtains a waveform. As described above, the waveform obtaining unit 11 obtains a waveform of the pressure of the fuel stored in the rail 150 as a function of time in the predetermined period.

Figure 7:
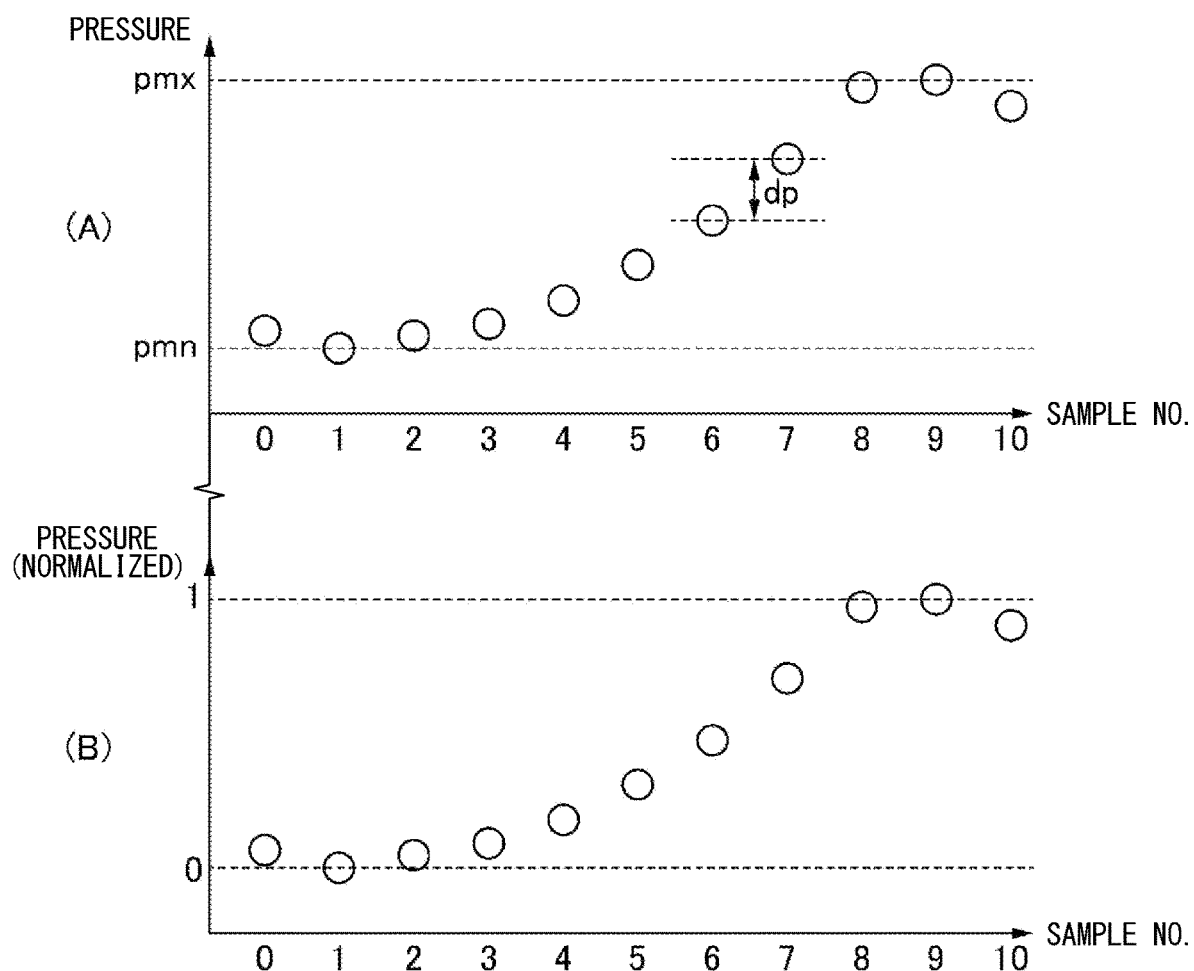
FIG. 7 is an example of a waveform obtained by a waveform obtaining unit.

FIG. 7(A) is an example of the waveform obtained by the waveform obtaining unit 11. The waveform obtaining unit 11 starts to sample pressure values of the waveform at the same time when the predetermined period starts. The pressure values are sampled every time the crank phase changes by 6 degrees. When the predetermined period is ended, sampling of the pressure values is also ended. In the example shown in FIG. 7(A), 11 pieces of data in total are sampled, but the number of pieces of data is not limited to this. Each piece of sampling data is given a sample number starting from 0 in the order of sampled time.

In step S03 following S02, it is determined whether the waveform obtained in step S02 is normal or not. A maximum value in the pieces of data is defined as pmx and a minimum value in the pieces of data is defined as pmn. The waveform is determined to be normal when an absolute value of a difference between pmx and pmn |pmx−pmn| exceeds a predetermined value and absolute values |dp| of a difference between adjacent ones of the pieces of data are less than a predetermined value.

The reason the waveform is not determined to be normal when |pmx−pmn| does not exceed the predetermined value is because it is difficult to accurately compare the waveform with the reference waveforms stored in the memory unit 13 if an amplitude of the waveform of the pressure is too small. The reason the waveform is not determined to be normal when any one of |dp| is equal to or greater than the predetermined value is because an influence of noise is large in this case and it is difficult to accurately compare the waveform with the reference waveforms stored in the memory unit 13. It should be noted that the "predetermined value" for comparing |pmx−pmn| is different from the "predetermined value" for comparing |dp|.

In case that the waveform is not determined to be normal in step S03, the series of the process shown in FIG. 6 is terminated for a moment. In this case, when the process shown in FIG. 6 is executed next time, the waveform is obtained again in step S02.

When the waveform is determined to be normal in step S03, the process proceeds to step S04. In step S04, a normalization processing is performed. The normalization processing is a process in which the waveform obtained in step S02 is converted such that a difference between the maximum value and the minimum value of the pressure in the waveform has a predetermined value. In this embodiment, the predetermined value is "1". FIG. 7(B) illustrates data obtained by normalizing the waveform shown in FIG. 7(A). In the normalized waveform, the minimum value is zero and the maximum value is 1.

When each piece of data in the waveform before normalization is defined as data[i] and each piece of data in the waveform after normalization is defined as data_n[i], a relationship therebetween is described with the following formula (1).

$$\mathrm{data\_}n[i]=(\mathrm{data}[i]-pmn)/(pmx-pmn) \quad (1)$$

A variable "i" in the formula (1) is a variable indicative of the above described sample number. By using the formula (1) for pieces of data given sample number, the waveform obtained in step S02 can be normalized.

In order to compare the waveform having been normalized, the reference waveforms stored in the memory unit 13 has also been normalized in the same way described above. That is, the reference waveforms stored in the memory unit 13 is stored in a state where the reference waveforms are normalized such that each difference between the maximum value and the minimum value of the pressure in each of the reference waveforms has the predetermined value (1 in this embodiment).

Figure 8:
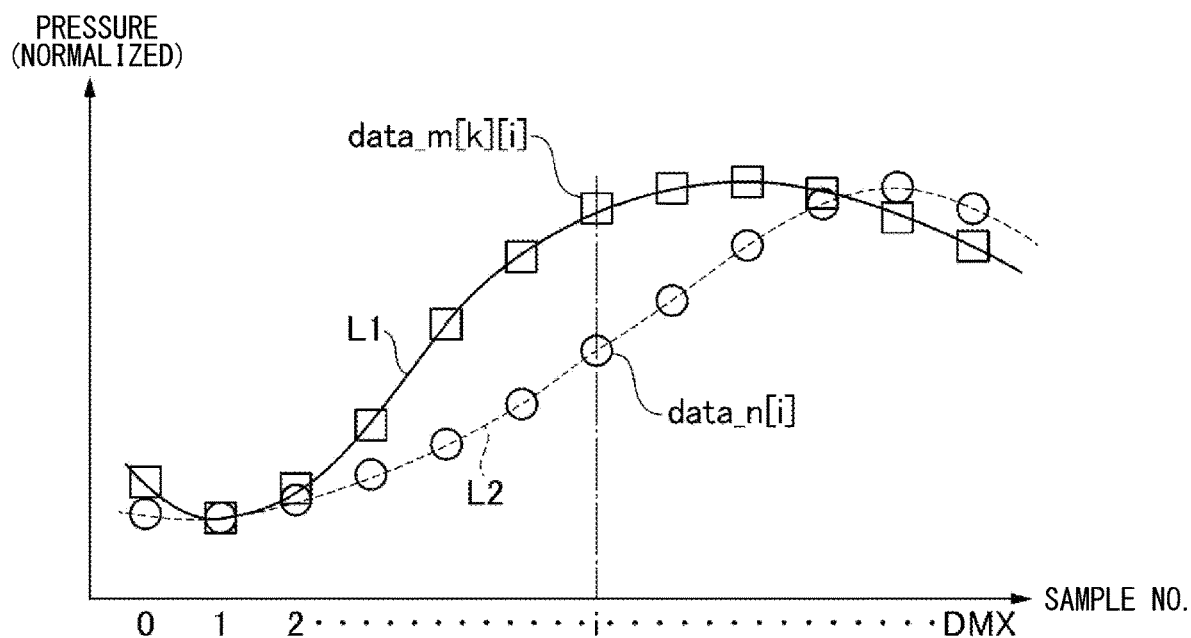
FIG. 8 is a diagram explaining a method to calculate a sum of squares.

In step S05 following step S04, a sum of squared differences between the waveform normalized in step S04 and each of the reference waveforms stored in the memory unit 13 is calculated. With reference to FIG. 8, the calculation method will be described.

The pieces of data arranged along a line L1 in FIG. 8 is data in one of the multiple reference waveforms stored in the memory unit 13. In order to distinguish from the waveform obtained by the waveform obtaining unit 11, the reference waveforms stored in the memory unit 13 is also referred to as "master waveforms". In FIG. 8, one piece of data in one of the mater waveforms is represented as data_m[k][i]. The above described "i" is the sample number. The above described "k" is a unique number assigned to each of the multiple master waveforms and is a numerical value from 0 to "total number of master waveforms−1". It can be said that k is a numerical value corresponding to the reference phase shift of each of the master waveforms. Hereinafter, k is referred to as "a master waveform number". "DMX" shown in FIG. 8 is a maximum value of the sample number.

The pieces of data arranged along a line L2 in FIG. 8 is data having been normalized in step S04. In FIG. 8, the data is expressed as data_n[i] as with the above-described formula (1). The above described "i" is the sample number.

In step S05, all values for all i (i.e., for all sample numbers) are calculated with the following formula (2) and the all values are summed.

$$(\text{data\_}m[k][i]-\text{data\_}n[i])^2 \quad (2)$$

A sum of squares that is calculated as a sum of the values calculated with the formula (2) is calculated as a large value when the normalized waveform obtained in step S05 is different from the master waveform. The smaller the sum of squares is, the more similar to the master waveform the waveform is.

Figure 9:
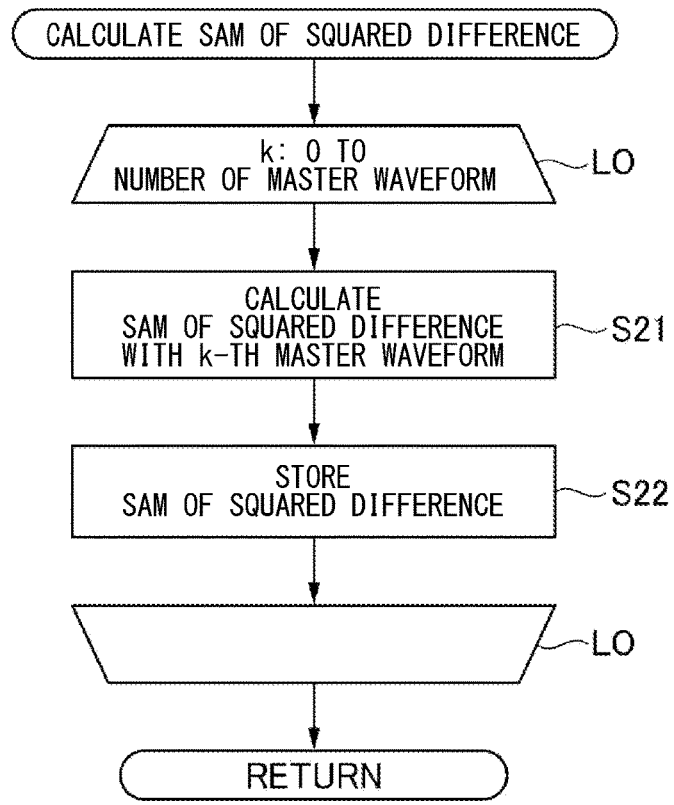
FIG. 9 is a flowchart of a process executed by the controller.

In FIG. 9, specific contents of the process executed in step S05 are described. A loop LO shown in the figure is executed once for k. i.e., for each of the master waveforms. In first step S21 in the loop LO, the sum of squares that is the sum of the all values calculated with the above-described formula (2) is calculated for a k-th master waveform. In step S22 following step S21, the sum of squares calculated in step S21 is stored in association with k that is the master waveform number.

As a result of performing the process described above, in step S05, the sum of squares that is the sum of the all values calculated with the formula (2) is calculated for each of the master waveforms stored in the memory unit 13 and the sum is stored in association with the reference phase shift corresponding to the master waveform.

In step S06 following step S05, the matching rate calculating unit 14 performs a process for calculating a matching rate. "A matching rate" is an index how much the waveform obtained by the waveform obtaining unit 11 matches with the master waveform stored in advance in the memory unit 13. The matching rate is calculated for each of the master waveforms by converting the above-described sum of squares. In this embodiment, the matching rate is low when the normalized waveform calculated in step S05 is different from the master waveform. The more similar to the master waveform the normalized waveform is, the higher the matching rate is. The matching rate is calculated to be a value in a range of 0 to 1.

Figure 10:
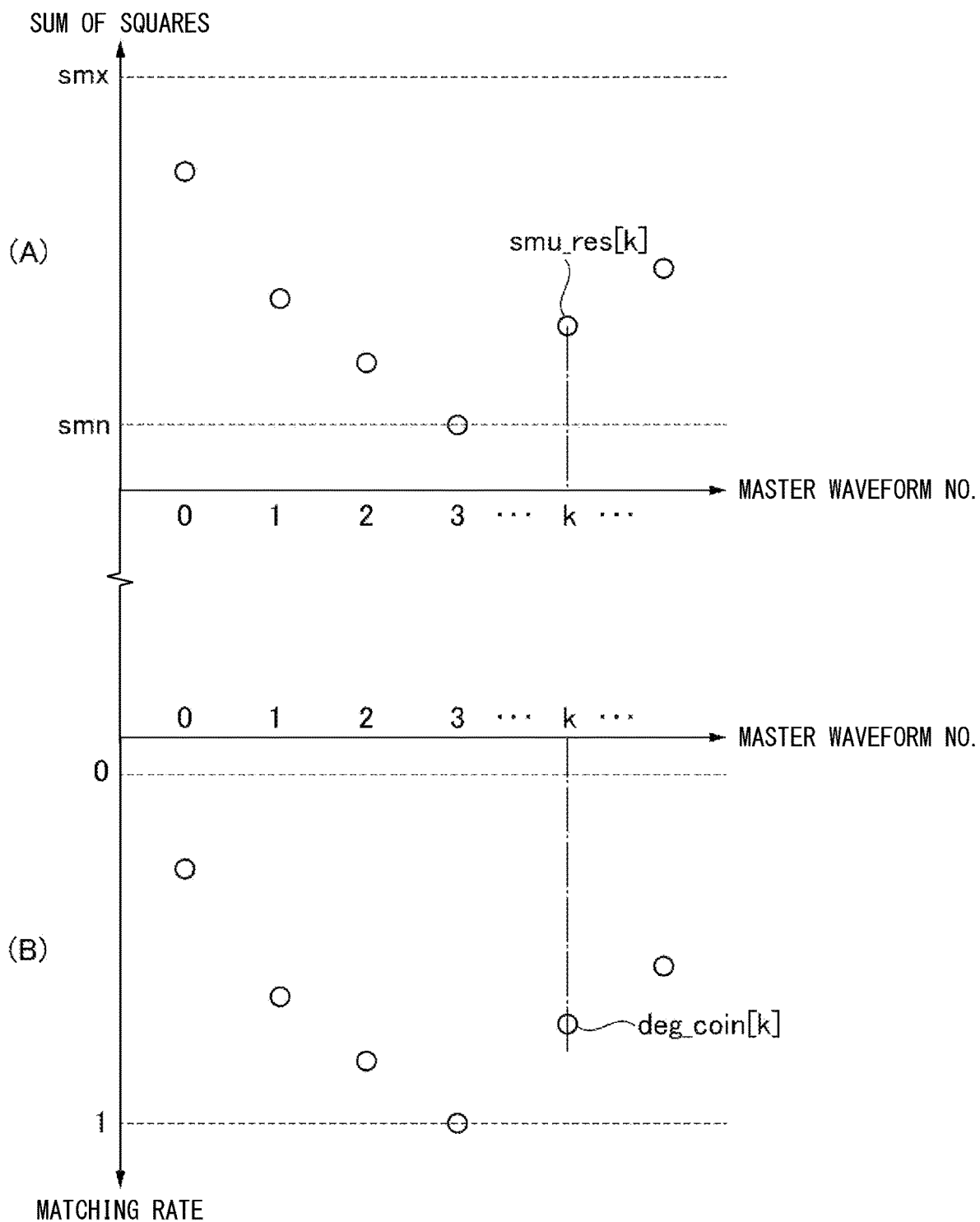
FIG. 10 is a diagram explaining a method to calculate a matching rate.

In FIG. 10(A), all values of sum of squares calculated in step S05 are plotted as smu_res[k]. The above-described "k" is the master waveform number. In FIG. 10(A), the smallest value among the calculated sum of squares is described as "smn". Further, in FIG. 10(A), "smx" is not the largest value of the calculated sum of squares but the largest value of the possible sum of squares. Specifically, smx is a sum of squares calculated when the all values calculated with the formula (2) is 1 and the value of smx is equal to the number of the master waveforms.

In FIG. 10(B), matching rates obtained by converting the values of the sum of squares shown in FIG. 10(A) are plotted as deg_coin[k]. The above-described "k" is the master waveform number. As described above, deg_coin[k] is calculated to be a value within a range from 0 to 1.

When the sum of squares that is calculated by summing the values calculated with the formula (2) for the master waveform whose master number is k is defines as "sum[k], deg_coin[k] indicative of the matching rate is calculated with the following formula (3).

$$\text{deg\_coin}[k]=1-(\text{sum}[k]-smn)/(smx-smn) \quad (3)$$

Returning to FIG. 6, description will be continued. After the matching rates are calculated for all master waveforms in step S06, the process proceeds to step S07. In step S07, an average of the matching rates calculated in step S06 is calculated. The average is calculated for each master waveform number. For example, after the series of the process shown in FIG. 6 is repeated five times and the process in step S06 is performed five times, the five matching rates are averaged for each master waveform number.

In step S08 following step S07, it is determined whether the number of times of calculating the matching rate in step S06 has a predetermined number of times or not. When the calculation times of the matching rate are less than the predetermined number of times, the series of the process shown in FIG. 6 is once terminated. In this case, the process in FIG. 6 is executed again in the next control cycle and the matching rate will be calculated in step S06. The predetermined number of times is set to a value equal to or larger than 2, but the predetermined number of times may be one.

When the number of times for calculating the matching rate has the predetermined number of times, the process proceeds to step S09. In step S09, the phase shift is calculated based on the matching rates calculated for every master waveform number. The phase shift obtaining unit 12 performs this process.

Figure 11:
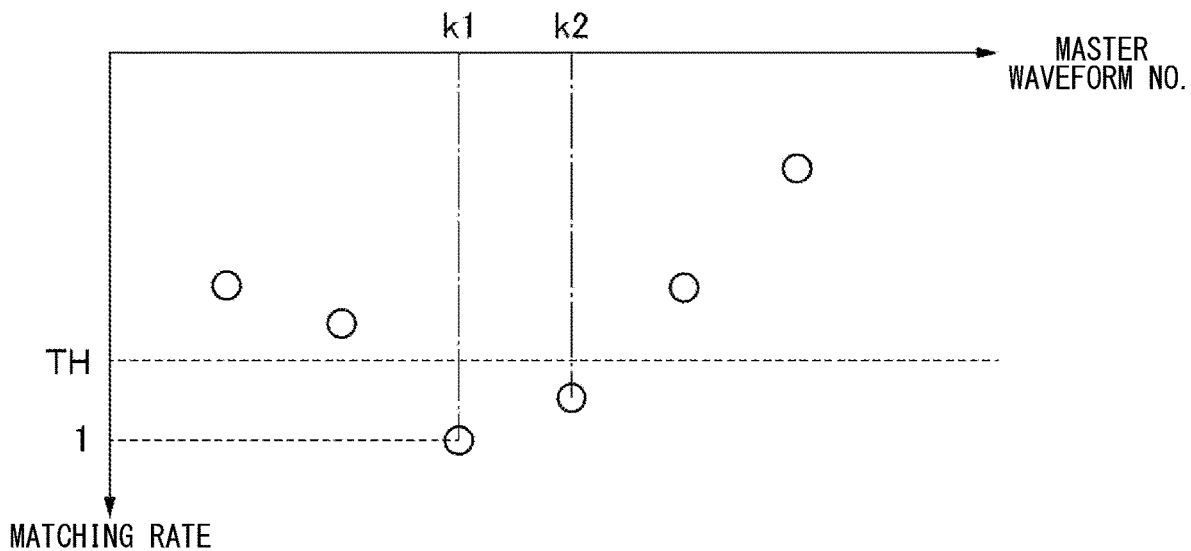
FIG. 11 is a diagram explaining a method to obtain the phase shift based on the matching rate.

In FIG. 11, a distribution of the matching rates calculated for every master waveform number are illustrated in the same manner as in FIG. 10(B). However, each of the matching rates plotted in FIG. 11 is the average calculated in step S07.

In this embodiment, a threshold TH that is less than 1 is set for the matching rate. In step S09, the phase shift obtaining unit 12 extracts only matching rates, from the multiple matching rates, that are equal to or greater than the threshold TH, selects the reference phase shifts corresponding to the extracted matching rates, and averages the selected reference phase shifts. In FIG. 11, master waveform whose master waveform number is k1 and the master waveform whose master waveform number is k2 are extracted, the reference phase shifts corresponding to the extracted master waveforms are selected, and the average of the selected phase shifts is obtained as the phase shift.

As described above, the phase shift obtaining unit 12 in this embodiment is configured to obtain the phase shift by selecting the master waveforms, from all of the master waveforms stored in the memory unit 13, that have matching rates calculated by the matching rate calculating unit 14 equal to or greater than the predetermined threshold TH, obtaining the reference phase shifts corresponding to the selected master waveforms, and averaging the reference phase shifts.

In step S10 following S09, a process to store the value of the phase shift obtained in step S09 in a nonvolatile storage device of the controller 10 is performed. Then, the series of processing shown in FIG. 6 is terminated. After the processing in step S09 and step S10 is performed, a repeat of the series of processing shown in FIG. 6 is stopped.

As described above, in the controller 10 according to this embodiment, the phase shift obtaining unit 12 is configured to obtain the phase shift based on the waveform obtained by the waveform obtaining unit 11. That is, the phase shift obtaining unit 12 obtains the phases shift, not based on the specific one timing such as a timing the change of the fuel pressure is at an inflection point, but based on the shape of the graph (i.e., the waveform) indicating a change as a function of time in a predetermined period. Thus, if noise such as pulsation is included in a part of the waveform, an influence of the noise can be reduced and the phase shift can be obtained relatively accurately.

The phase shift obtaining unit 12 obtains the phase shift corresponding to the waveform obtained by the waveform obtaining unit 11 by referring to the correspondence table stored in the memory unit 13, i.e., the correspondence table between the master waveforms and the reference phase shifts. By referring to the correspondence table prepared in advance, it is possible to easily obtain the phase shift based on the sampled waveform.

The master waveforms are normalized such that a difference of the maximum value and the minimum value of the pressure in each of the master waveforms has a predetermined value and stored in the memory unit. The phase shift obtaining unit 12 normalizes the waveform obtained by the waveform obtaining unit 11 such that the maximum value and the minimum value of the pressure in the waveform and then obtains the phase shift corresponding to the normalized waveform.

The waveform of the fuel pressure in the rail 150 is likely to have variations especially in the amplitude direction. In view of this, in this embodiment, the influence of the variations described above is reduced by normalizing the sampled waveform and the master waveforms in advance. Thereby, the phase shift can be obtained more accurately.

In this embodiment, the master waveforms are stored in the memory unit 13 in a normalized state from the beginning. Instead of this aspect, the master waveforms may be stored in the memory unit 13 without being normalized and normalized every time just before calculating the sum of squares in step S05 in FIG. 6.

The phase shift obtaining unit 12 obtains the phase shift depending on the matching rate calculated by the matching rate calculating unit 14. Not based on the sum of squares calculated in step S05, but based on the matching rate calculated as a value in a range of 0 to 1, it is possible to appropriately set the threshold TH and select the master waveforms based on the threshold TH.

The phase shift obtaining unit 12 obtains the phase shift by selecting master waveforms from the master waveforms stored in the memory unit 13 that have the matching rates calculated by the matching rate calculating unit 14 equal to or greater than the threshold TH, obtaining the reference phase shifts in association with the selected master waveforms, and averaging the reference phase shifts. As a result, if an error occurs in calculating the matching rate, the phase shift is accurately calculated.

When the influence of errors can be ignored, the phase shift obtaining unit 12 may obtain the phase shift by selecting the master waveform from the master waveforms stored in the memory unit 13 that has the highest matching rate and by obtaining the reference phase shift in association with the selected master waveform. In this case, in the example of FIG. 10(B), the reference phase shift corresponding to the master waveform whose master waveform number is 3 is obtained as the phase shift.

The waveform obtaining unit 11 obtains the waveform by sampling the pressure values of the fuel stored in the rail 150 at predetermined timings in the predetermined period. The matching rate calculating unit 14 calculates the matching rate using the sum of squared differences between the pressure values sampled by the waveform obtaining unit 11 and the corresponding pressure values in each of the master waveforms stored in the memory unit 13. As a result, it is possible to easily compare the sampled waveform with the master waveforms and calculate the matching rate based on the comparison.

The waveform obtaining unit 11 obtains the waveform when the predetermined obtaining condition is satisfied, that is, when the determination of step S01 in FIG. 1 is Yes. As a result, it can be prevented to happen a case such as that the pressure values are sampled in unsuitable conditions for obtaining the waveform and that, as a result, an incorrect phase shift is obtained.

Figure 12:
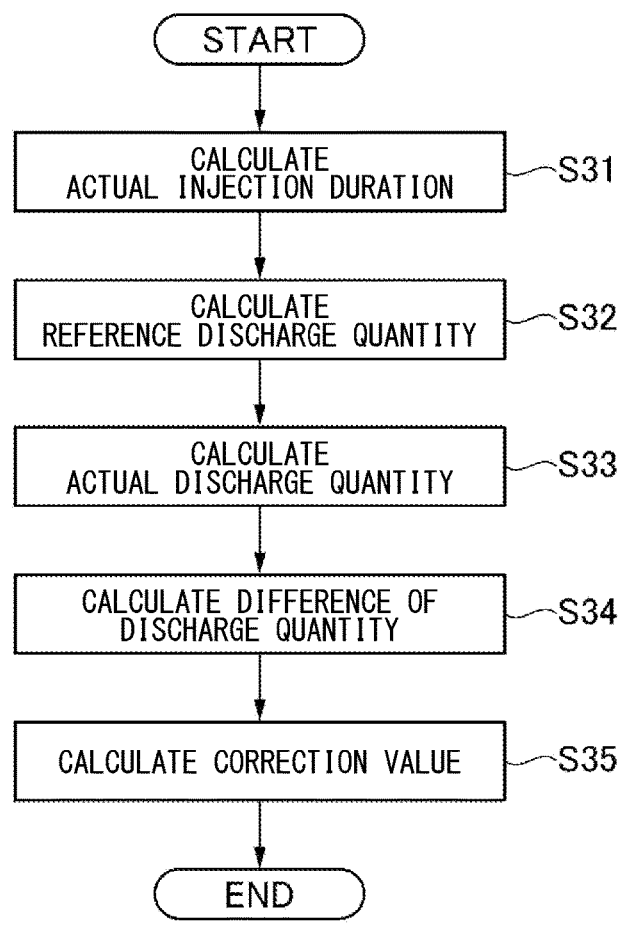
FIG. 12 is a flowchart of a process executed by the controller.

Next, a method for correcting the injection quantity of the fuel injected by the fuel injection valve 170 based on the phase shift obtained by the phase shift obtaining unit 12 will be described. The series of processing shown in FIG. 12 is repeatedly executed by the injection quantity correcting unit 16 during a period when the internal combustion engine 160 is operated. The cycle in which the process is the same with the cycle in which the fuel injection valve 170 injects the fuel.

In the first step S31, an actual injection duration is calculated. The actual injection duration is a period in which the injection instruction signal is turned on. In FIG. 3, the actual injection duration is the duration TM1. The actual injection duration is appropriately calculated with taking into account various parameters such as the depression amount detected by the accelerator sensor 22, the phase shift stored in step S10 in FIG. 6, transmission delay in transmitting the pressure of the fuel from the pump 130 to the fuel injection valve 170, and the like.

After the actual injection duration is calculated in step S31 and the fuel is injected based on the actual injection duration, the process proceeds to step S32. In step S32, a reference discharge quantity is calculated. "The discharge quantity" is a quantity of the fuel discharged from the pump 130 in the actual injection duration such as the period TM1. "The reference discharge quantity" is the discharge quantity at a specified phase shift. In this embodiment, the specified phase shift is zero degree.

Figure 13:
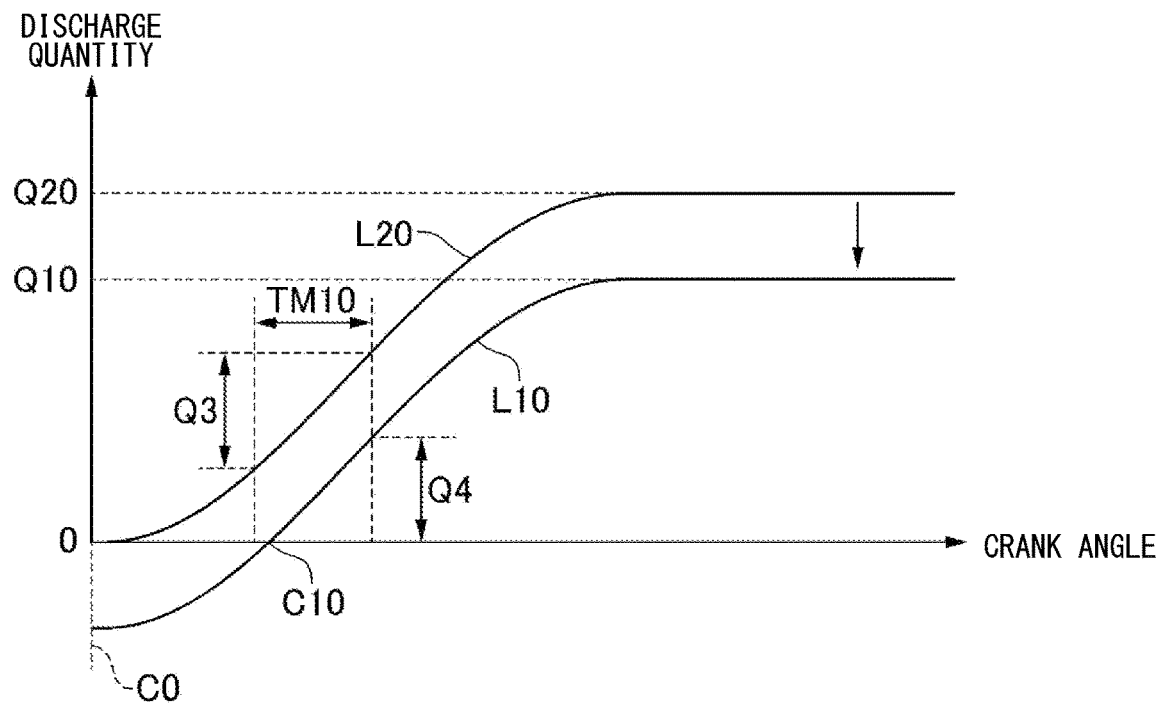
FIG. 13 is a diagram explaining a method to calculate a discharge quantity.

With reference to FIG. 13, a method to calculate the reference discharge quantity will be described. A line L20 in FIG. 13 illustrates a first reference graph of the fuel quantity discharged from the pump 130 as a function of time when the adjusting valve 140 is fully opened. The horizontal axis is the crank phase. C0 in FIG. 13 is a crank phase when the piston of the internal combustion engine 160 is at the bottom dead center BDC. The specified phase shift in this example is zero degree, so that the crank phase is C0 when the plunger 135 is at the bottom dead center BDC.

When the adjusting valve 140 is fully opened, the fuel is discharged from the pump 130 as the plunger 135 moves upward from the bottom dead center BDC and finally, a total quantity of the discharged fuel reaches Q20. Since the graph shown in the line L20 is defined depending on the configuration of the pump 130, the first reference graph is obtained in advance by measurements and the like and stored in the memory unit 13.

Q10 in FIG. 13 is a requested quantity of the fuel discharged from the pump 130 to the rail 150. As described above, the opening degree of the adjusting valve 140 is adjusted such that the quantity of the fuel to be discharged from the pump 130 has the requested quantity. A line L10 in FIG. 13 illustrates a second graph obtained by offsetting the line L20 downward such that the total quantity of the fuel discharged from the pump 130 is adjusted to Q10 from Q20. The graph in the line L10 is a graph generated by offsetting the first reference graph (i.e., the line L20) of the fuel quantity discharged from the pump 130 when the adjusting valve 140 is fully opened depending on the requested quantity of Q10.

When the phase shift is zero, the change of the fuel quantity actually discharged from the pump 130 as a function of time is along the line L10. However, since the fuel quantity discharged from the pump 130 is not less than zero, the discharged fuel quantity is zero until the crank phase reaches C10 in FIG. 13.

In FIG. 13, the actual injection duration is shown as the duration TM10. "Q4" in the figure is an increase quantity of the fuel discharged from the pump 130 in the duration TM10. That is, Q4 is the discharge quantity in the duration TM10. Therefore, Q4 is "the reference discharge quantity". As described above, "the reference discharge quantity" can be easily calculated based on the graph of the line L10 generated by offsetting the graph of the line L20 depending on the requested quantity. When the requested quantity is Q20 and the adjusting valve 140 is fully opened, Q3 shown in FIG. 13 is calculated as "the reference discharge quantity".

In step S33 following step S32 in FIG. 12, an actual discharge quantity is calculated. "The actual discharge quantity" is the discharge quantity at the phase shift obtained by the phase shift obtaining unit 12.

Figure 14:
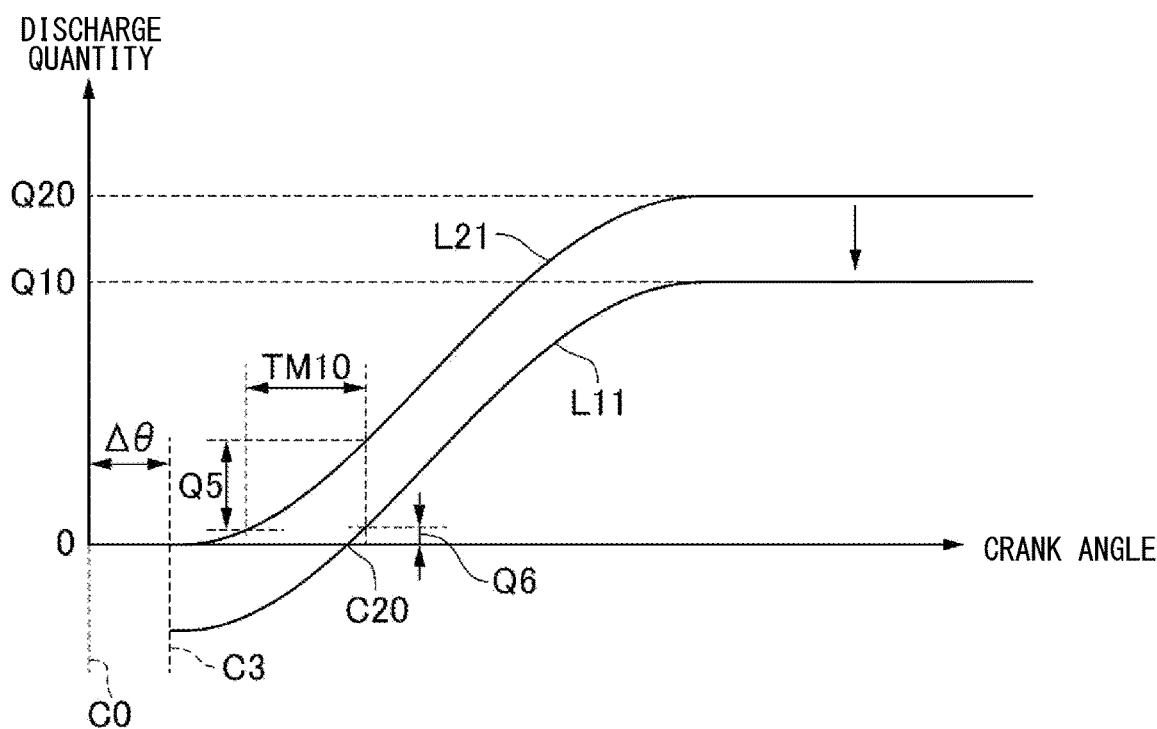
FIG. 14 is a diagram explaining a method to calculate a discharge quantity.

With reference to FIG. 14, a method to calculate the actual discharge quantity will be described. A line L21 in FIG. 14 illustrates a graph obtained by offsetting the line L20 in FIG. 13 rightward by Δθ. Δθ is the phase shift obtained by the phase shift obtaining unit 12. The line L21 is a graph of the fuel quantity discharged from the pump 130 as a function of time when the adjusting valve 140 is fully opened and the phase shift is Δθ. C3 in FIG. 14 is calculated by adding Δθ to C0 and corresponds to the crank phase when the plunger 135 is at the bottom dead center BDC.

A line L11 in FIG. 14 is an actual discharge quantity graph obtained by offsetting the line L21 downward such that the fuel quantity discharged from the pump 130 is adjusted to Q10 from Q20. The graph of the line L11 is a graph generated by offsetting the graph (i.e., the line L21) of the fuel quantity discharged from the pump 130 as a function of time when the adjusting valve 140 is fully opened. The line L11 is offset from the line L10 rightward by Δθ.

When the phase shift is Δθ, the change of the fuel quantity actually discharged from the pump 130 as a function of time is along the line L11. However, since the fuel quantity actually discharged from the pump 130 is not less than zero, the quantity of the discharged fuel is zero until the crank phase reaches C20 in FIG. 14.

In FIG. 14, similarly to FIG. 13, the actual injection duration is shown as the duration TM10. "Q6" in FIG. 14 is an increase quantity of the fuel discharged from the pump 130 in the duration TM10. That is, Q6 is the discharge quantity in the duration TM10. Therefore, Q6 corresponds to "the actual discharge quantity". As described above, "the actual discharge quantity" can be easily calculated based on the graph of the line L11 offset from the graph of the line L21 depending on the requested quantity. When the requested quantity is Q20 and the adjusting valve 140 is fully opened, Q5 shown in FIG. 14 is calculated as "the actual discharge quantity".

As is clear from the comparison between Q4 in FIG. 13 and Q6 in FIG. 14, the discharge quantity differs depending on the phase shift. In step S34 following step S33, a discharge difference between "the reference discharge quantity" shown in Q4 and "the actual discharged quantity" shown in Q6 is calculated.

The difference between a fuel quantity actually injected by the fuel injection valve 170 and a requested injection quantity indicated by a width of the injection instruction signal is hereinafter defined as "an injection error". The inventors of the present disclosure found that there was a correlation between the injection error and the discharge difference calculated as described above. Thus, by storing a measuring map indicative of correspondence between the correction value to making the injection error zero and the discharge difference calculated as described above, the correction value can be calculated based on the calculated discharge difference by referring to the measuring map. In step S35 following step S34, the correction value is calculated with the above-described method.

The correction value calculated in step S35 is added to the actual injection duration calculated in step S31 when the series of the process shown in FIG. 12 is executed in next control cycle. Thereby, the fuel quantity to be injected by the fuel injection valve 170 can be closer to the requested injection quantity.

As described above, the injection quantity correcting unit 16 of the controller 10 in this embodiment is configured to correct the injection quantity of the fuel injected by the fuel injection valve 170 based on the phase shift obtained by the phase shift obtaining unit 12.

The injection quantity correcting unit 16 calculates the discharge difference between "the reference discharge quantity" at the specified phase shift and "the actual discharge quantity" at the phase shift obtained by the phase shift obtaining unit 12. Additionally, the injection quantity correcting unit 16 corrects the injection quantity of the fuel injected by the fuel injection valve 170 based on the discharge difference. Thereby, the injection quantity is accurately corrected.

The injection quantity correcting unit 16 calculates each of "the reference discharge quantity" and "the actual discharge quantity" by referring to the graph generated by offsetting the graph of the quantity of the fuel theoretically discharged from the pump 130 with the adjusting valve 140 fully opened depending on the requested value of the fuel quantity discharged from the pump 130 and calculate the discharge difference therebetween. Thereby, even if the opening degree of the adjusting valve 140 is changed, the discharge difference can be precisely and easily calculated.

Figure 15:
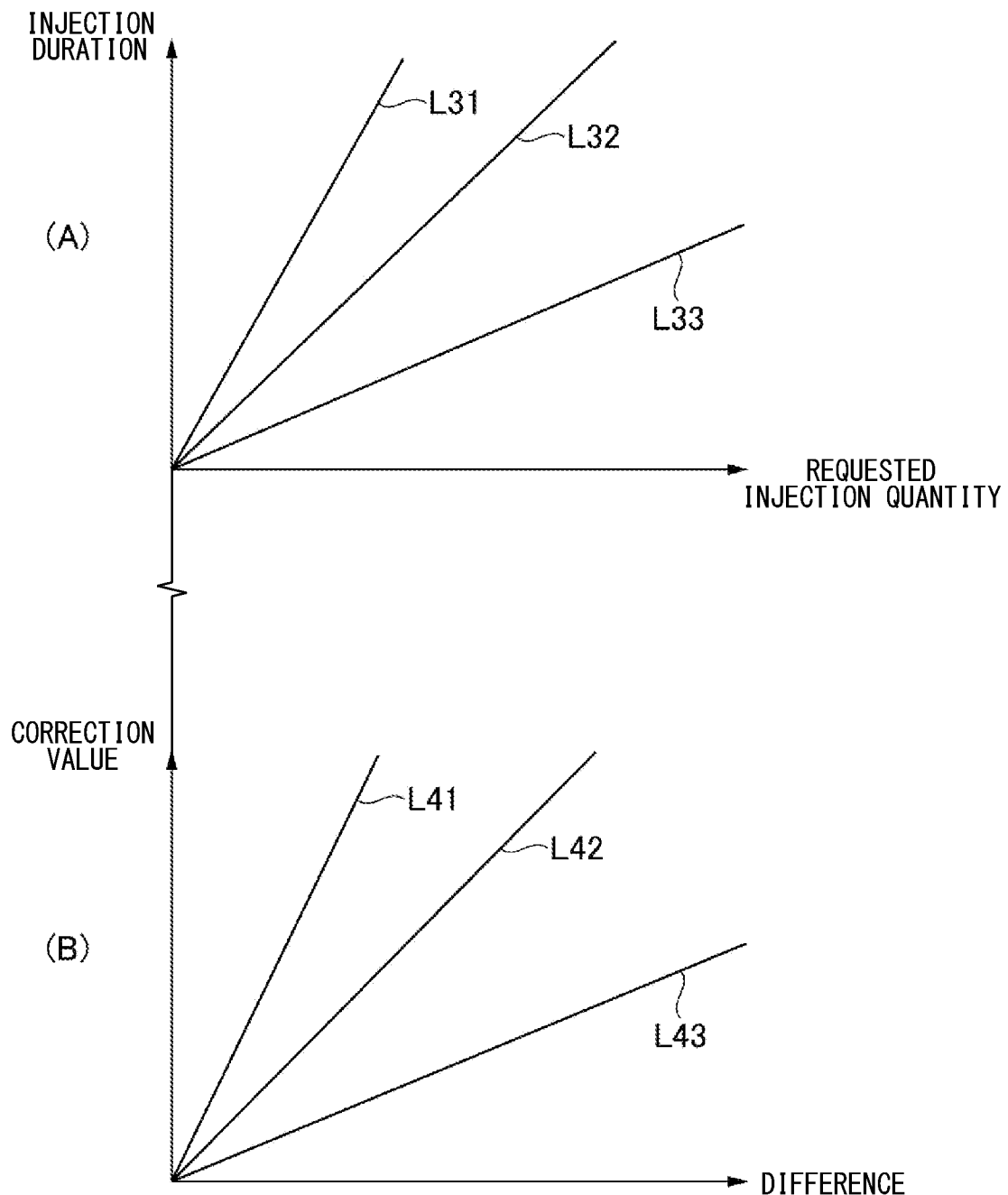
FIG. 15 is a schematic diagram of an example of a map that is created in advance to correct an injection quantity of the fuel.

FIG. 15(A) illustrates corresponding relations, for each value of the pressures in the rail 150, between the requested injection quantity and the injection duration for injecting the requested quantity of the fuel at the phase shift of zero. A line L31 illustrates the corresponding relation at a relatively low pressure and a line L33 illustrates the corresponding relation at a relatively high pressure. Such corresponding relationships are measured in advance for each value of pressure in the rail 150 and stored in the memory unit 13. The controller 10 determines the injection duration according to the requested injection quantity by referring to such correspondence map and generates the injection instruction signals as shown in FIG. 5(A).

FIG. 15(B) illustrates corresponding relationships, for each value of pressure in the rail 150, of the correction value and the discharge difference between "the reference discharge quantity" and "the actual discharge quantity". A line L41 illustrates the corresponding relationship at a relatively low pressure and a line L43 illustrates the corresponding relationship at a relatively high pressure. Such corresponding relationships are measured in advance for each value of pressure in the rail 150 and stored in the memory unit 13. The controller 10 calculates the correction value in step S35 in FIG. 12 by referring to such correspondence map.

Conventionally, it is necessary to prepare multiple corresponding relationship shown in FIG. 15(A) corresponding to various phase shifts. However, the work to obtaining the multiple relationships such as in FIG. 15(A) as changing the phase shift requires much effort and time since the work is performed by repeatedly attaching and detaching the pump 130.

In contrast, in this embodiment, it is only required to prepare two correspondence maps shown in FIG. 15(A) and FIG. 15(B). Thus, the effort and time for the adaptation can be significantly reduced.

Figure 16:
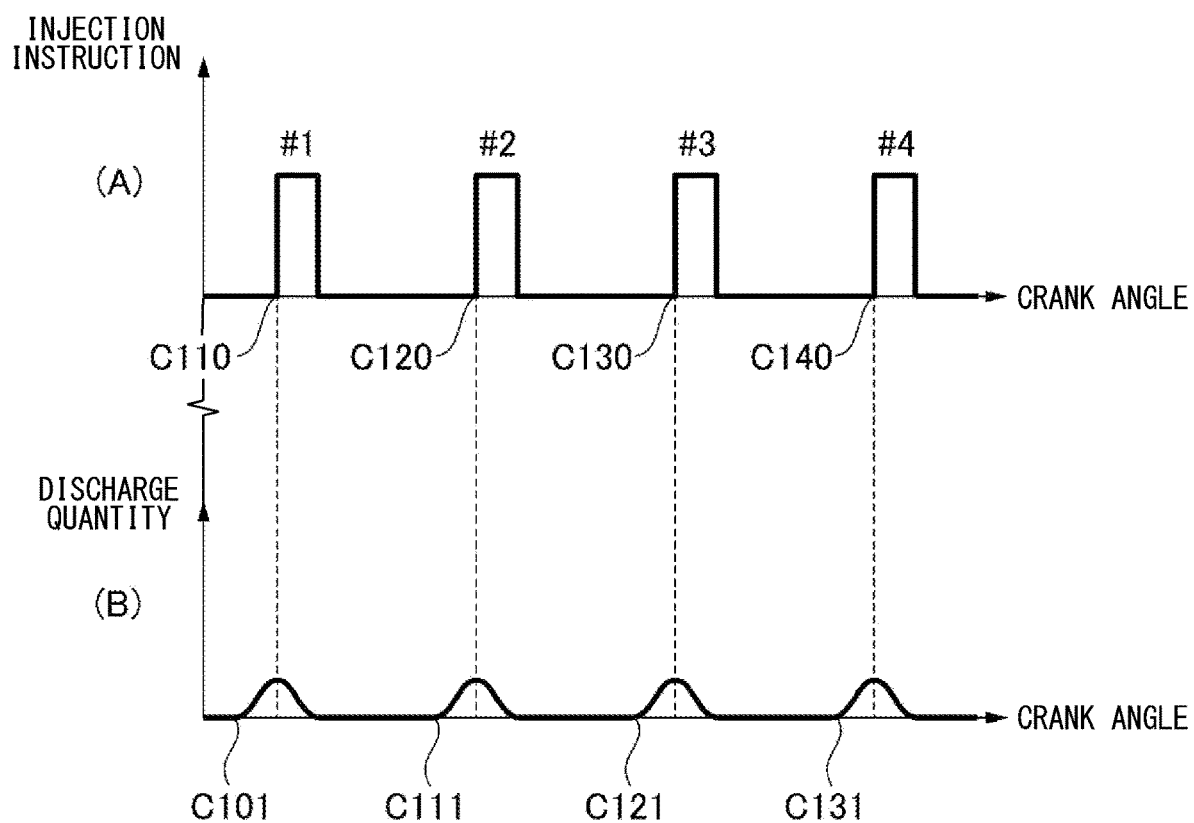
FIG. 16 is a diagram explaining a relationship between timings fuel is injected into cylinders and timings the fuel is discharged from the pump.

FIG. 16(A) is an example of the injection instruction signals transmitted to each of the fuel injection valves 170 of the cylinders. In this example, the fuel is injected into the first cylinder at a timing the crank phase is C110, into the second cylinder at a timing the crank phase is C120, into the third cylinder at a timing the crank phase is C130, and into the fourth cylinder at a timing the crank phase shift is C140.

FIG. 16(B) is an example of change of the fuel quantity discharged from the pump 130 as a function of time. In this embodiment, the pump 130 starts to discharge the fuel at timings the crank phase is C101, C111, C121, and C131.

A length of a period from when the pump 130 starts to discharge the fuel to when the fuel is started to be injected into each cylinder is the same among the cylinders in this embodiment. That is, the fuel supply system of the vehicle MV according to this embodiment is configured to synchronously perform discharge of the fuel from the pump 130 and injection of the fuel from the fuel injection valve 170.

However, the method for obtaining the phase shift described above and the method for correcting the injection quantity based on the phase shift described above may be applied for a system that asynchronously perform discharge of the fuel from the pump 130 and the injection of the fuel from the fuel injection valve 170.

In the asynchronous system, the fuel is discharged from the pump 130, for example, six times in a period in which the fuel is injected into the four cylinders. In this case, a period from when the pump 130 is started to discharge the fuel to when the fuel is started to be injected into the cylinder differs in each cylinder and changes with the passage of time. However, when paying attention to a specific cylinder, the length of the period returns to the original length in a specific cycle. Thus, by obtaining the waveform every specific cycle and obtaining the phase shift based on the waveform, the phase shift can be accurately obtained with the similar method described above even in the asynchronous system.

In the asynchronous system, a pressure-feeding pattern of the fuel to the specific cylinder differs every time. Thus, if the phase shift is obtained with the similar method in this embodiment in the asynchronous system, it is possible to specify the pressure-feeding pattern according to the phase shift and correct the injection quantity corresponding to the specified pressure-feeding pattern. That is, the phase shift obtained by the phase shift obtaining unit 12 can be used to specify the pressure-feeding pattern in the asynchronous system.

The phase shift obtained by the phase shift obtaining unit 12 can be used for something other than the correction of the injection quantity. For example, when the phase shift is periodically obtained and the obtained phase shift discontinuously changes, it is possible to detect that the genuine pump 130 is replaced with a non-genuine pump.

The present embodiments have been described above with reference to concrete examples. However, the present disclosure is not limited to those specific examples. Those specific examples that are appropriately modified in design by those skilled in the art are also encompassed in the scope of the present disclosure, as far as the modified specific examples have the features of the present disclosure. Each element included in each of the specific examples described above and the arrangement, condition, shape, and the like thereof are not limited to those illustrated, and can be changed as appropriate. The combinations of the elements in each of the specific examples described above can be changed as appropriate, as long as it is not technically contradictory.

The control device and the control method thereof described in the present disclosure may be embodied with one or more special computer provided with at least one processor and at least one memory programmed to execute one or more functions embodied with a computer program. The control device and the control method described in the present disclosure may be embodied with a special computer provided with at least one processor that includes at least one special hardware logic circuit. The control device and the control method thereof described in the present disclosure may be embodied with at least one special computer provided with a combination of a processor and a memory programmed to implement one or more functions and at least one processor provided with at least one hardware logic circuit. The computer program may be stored, as instructions executable by a computer, in a tangible non-transitory computer-readable medium. The special hardware logic circuit and the hardware logic circuit may be embodied with a digital circuit including multiple logic circuits or may be embodied with an analog circuit.

What is claimed is:

1. A controller for a vehicle, the vehicle including:
   a pump configured to discharge a fuel by reciprocating a plunger;
   a rail configured to store the fuel discharged from the pump; and
   a fuel injection valve configured to inject the fuel supplied from the rail,
   the controller comprising:
   a waveform obtaining unit configured to obtain a waveform of a pressure of the fuel stored in the rail as a function of time in a predetermined period;
   a phase shift obtaining unit configured to obtain a phase shift based on the waveform obtained by the waveform obtaining unit, the phase shift being an offset between a timing the plunger reciprocated in the pump arrives at a first position and a timing a piston reciprocating in an internal combustion engine of the vehicle arrives at a second position; and
   a memory unit configured to store a correspondence table listing a plurality of reference waveforms and a plurality of reference phase shifts, wherein
   the phase shift obtaining unit is further configured to obtain the phase shift by comprising the waveform obtained by the waveform obtaining unit with the plurality of reference waveforms stored in the memory unit and referring to the correspondence table in the memory unit.

2. The controller according to claim 1, wherein the plurality of reference waveforms stored in the memory unit are normalized such that a difference between a maximum value and a minimum value of the pressure in each of the plurality of reference waveforms has a predetermined value.

3. The controller according to claim 1, wherein the phase shift obtaining unit is further configured to:
   normalize the waveform obtained by the waveform obtaining unit such that a difference between a maximum value and a minimum value of the pressure in the waveform has a predetermined value; and
   obtain the phase shift by referring to the correspondence table using the normalized waveform.

4. The controller according to claim 1 further comprising a matching rate calculating unit configured to calculate a matching rate between the waveform obtained by the waveform obtaining unit and each of the plurality of reference waveforms stored in the memory unit, wherein
the phase shift obtaining unit is further configured to obtain the phase shift by referring to the correspondence table using at least one of the plurality of reference waveforms that is selected based on the matching rate calculated by the matching rate calculating unit.

5. The controller according to claim 4, wherein the phase shift obtaining unit is further configured to obtain the phase shift by referring to the correspondence table using one of the plurality of reference waveforms that has a highest matching rate calculated by the matching rate calculating unit.

6. The controller according to claim 4, wherein the phase shift obtaining unit is further configured to obtain the phase shift by:
   selecting two or more reference waveforms from the plurality of reference waveforms in the correspondence table, each of the two or more reference waveforms having the matching rate equal to or greater than a predetermined threshold;
   selecting two or more reference phase shifts from the plurality of reference phase shifts in the memory unit corresponding to the two or more reference waveforms; and
   averaging the selected two or more reference phase shifts.

7. The controller according to claim 4, wherein the waveform obtaining unit is further configured to sample a plurality of pressure values of the waveform at predetermined timings in the predetermined period, and
the matching rate calculating unit is further configured to calculate the matching rate by calculating a sum of squared differences between the plurality of pressure values and a plurality of corresponding reference pressure values of each of the plurality of reference waveforms in the correspondence table.

8. The controller according to claim 1, wherein the waveform obtaining unit is further configured to obtain the waveform when a predetermined obtaining condition is satisfied.

9. The controller according to claim 1 further comprising an injection quantity correcting unit configured to correct an injection quantity of the fuel to be injected by the fuel injection valve based on the phase shift obtained by the phase shift obtaining unit.

10. The controller according to claim 9, wherein the injection quantity correcting unit is further configured to:
    calculate a reference discharge quantity that is a quantity of the fuel theoretically discharged from the pump to the rail during a period the fuel is injected by the fuel injection valve at a specified phase shift;
    calculate an actual discharge quantity that is a quantity of the fuel actually discharged from the pump to the rail during the period the fuel is injected by the fuel injection valve at the phase shift obtained by the phase shift obtaining unit;
    calculate a difference between the reference discharge quantity and the actual discharge quantity; and
    correct the injection quantity of the fuel to be injected by the fuel injection valve depending on the difference.

11. The controller according to claim 10, wherein the pump includes an adjusting valve configured to adjust a quantity of the fuel to be discharged from the pump to the rail depending on a requested quantity,
the memory unit stores a first reference graph of an estimated quantity of the fuel discharged from the pump to the rail as a function of time if the adjusting valve is fully opened, and
the injection quantity correcting unit is further configured to:
    obtain a second reference graph by offsetting the first reference graph depending on the requested quantity;
    calculate the reference discharge quantity by referring to the second reference graph;
    obtain an actual discharge quantity graph by offsetting the first reference graph depending on the requested quantity and the phase shift obtained by the phase shift obtaining unit; and
    calculate the actual discharge quantity by referring to the actual discharge quantity graph.

12. A controller for a vehicle, the vehicle including:
a pump configured to discharge a fuel by reciprocating a plunger;
a rail configured to store the fuel discharged from the pump; and
a fuel injection valve configured to inject the fuel supplied from the rail,
the controller comprising:
a processor programmed to:
    obtain a waveform of a pressure of the fuel stored in the rail as a function of time in a predetermined period; and
    obtain a phase shift based on the waveform, the phase shift being an offset between a timing the plunger reciprocated in the pump arrives at a first position and a timing a piston reciprocating in an internal combustion engine of the vehicle arrives at a second position; and
a memory configured to store a correspondence table listing a plurality of reference waveforms and a plurality of reference phase shifts, wherein
the processor is further programmed to obtain the phase shift by comparing the waveform obtained by the waveform obtaining unit with the plurality of reference waveforms stored in the memory unit and referring to the correspondence table in the memory unit.

13. The controller according to claim 12, wherein
the plurality of reference waveforms stored in the memory unit are normalized such that a difference between a maximum value and a minimum value of the pressure in each of the plurality of reference waveforms has a predetermined value, and
the processor is further programed to:
  normalize the waveform such that a difference between a maximum value and a minimum value of the pressure in the waveform has a predetermined value; and
  obtain the phase shift by referring to the correspondence table using the normalized waveform.

14. The controller according to claim 12, wherein
the processor is further programmed to:
  calculate a matching rate between the waveform and each of the plurality of reference waveforms stored in the memory unit; and
  obtain the phase shift by referring to the correspondence table using at least one of the plurality of reference waveforms that is selected based on the matching rate.

15. The controller according to claim 14, wherein
the processor is further programmed to:
  sample a plurality of pressure values of the waveform at predetermined timings in the predetermined period; and
  calculate the matching rate by calculating a sum of squared differences between the plurality of pressure values and a plurality of corresponding reference pressure values of each of the plurality of reference waveforms in the correspondence table.

16. The controller according to claim 12, wherein
the processor is further programmed to correct an injection quantity of the fuel to be injected by the fuel injection valve based on the phase shift.

17. The controller according to claim 16, wherein
the processor is further programmed to:
  calculate a reference discharge quantity that is a quantity of the fuel theoretically discharged from the pump to the rail during a period the fuel is injected by the fuel injection valve at a specified phase shift;
  calculate an actual discharge quantity that is a quantity of the fuel actually discharged from the pump to the rail during the period the fuel is injected by the fuel injection valve at the phase shift obtained by the phase shift obtaining unit;
  calculate a difference between the reference discharge quantity and the actual discharge quantity; and
  correct the injection quantity of the fuel to be injected by the fuel injection valve depending on the difference.

18. The controller according to claim 17, wherein
the pump includes an adjusting valve configured to adjust a quantity of the fuel to be discharged from the pump to the rail depending on a requested quantity,
the memory unit stores a first reference graph of an estimated quantity of the fuel discharged from the pump to the rail as a function of time if the adjusting valve is fully opened, and
the processor is further programmed to:
  obtain a second reference graph by offsetting the first reference graph depending on the requested quantity;
  calculate the reference discharge quantity by referring to the second reference graph;
  obtain an actual discharge quantity graph by offsetting the first reference graph depending on the requested quantity and the phase shift obtained by the phase shift obtaining unit; and
  calculate the actual discharge quantity by referring to the actual discharge quantity graph.

* * * * *